US012760782B2

(12) United States Patent
Cheer et al.

(10) Patent No.: US 12,760,782 B2
(45) Date of Patent: Oct. 13, 2026

(54) RESONATOR, RESONATOR ARRAY, VIBRATION CONTROL SYSTEM AND METHOD

(71) Applicant: BAE SYSTEMS plc, London (GB)

(72) Inventors: Jordan Cheer, Southampton (GB); Stephen Daley, Southampton (GB); Lawrence Singleton, Southampton (GB)

(73) Assignee: BAE SYSTEMS PLC, London (GB)

( * ) Notice: Subject to any disclaimer, the term of this patent is extended or adjusted under 35 U.S.C. 154(b) by 348 days.

(21) Appl. No.: 18/692,660

(22) PCT Filed: Sep. 12, 2022

(86) PCT No.: PCT/GB2022/052304
§ 371 (c)(1),
(2) Date: Mar. 15, 2024

(87) PCT Pub. No.: WO2023/041898
PCT Pub. Date: Mar. 23, 2023

(65) Prior Publication Data

US 2024/0376959 A1 Nov. 14, 2024

(30) Foreign Application Priority Data

Sep. 15, 2021 (EP) .................................... 21275131
Sep. 15, 2021 (GB) .................................... 2113181
Aug. 31, 2022 (GB) .................................... 2212591

(51) Int. Cl.
*F16F 15/04* (2006.01)
*F16F 15/03* (2006.01)

(52) U.S. Cl.
CPC .............. *F16F 15/04* (2013.01); *F16F 15/03* (2013.01); *F16F 2226/04* (2013.01); *F16F 2230/0005* (2013.01); *F16F 2230/08* (2013.01)

(58) Field of Classification Search
None
See application file for complete search history.

(56) References Cited

U.S. PATENT DOCUMENTS 4,145,936 A 3/1979 Vincent et al.
4,922,159 A * 5/1990 Phillips ................. F16F 7/1011
73/514.24

(Continued)

FOREIGN PATENT DOCUMENTS

CN 105927707 A 9/2016
CN 107606026 A 1/2018

(Continued)

OTHER PUBLICATIONS

KR-101184284-B1: English Machine Translation (Year: 2012).*

(Continued)

*Primary Examiner* — Melanie Torres Williams
(74) *Attorney, Agent, or Firm* — Finch & Maloney PLLC

(57) ABSTRACT

According to the present invention there is provided a vibration control system comprising: a resonator comprising: a base attachable to an external body; a control element; and one or more connection elements each having a resilient portion, wherein the control element is resiliently connected to the base by the one or more connection elements such that relative movement between the control element and the base is facilitated by the one or more connection elements; and a driving mechanism, wherein the resonator comprises at least a part of the driving mechanism.

18 Claims, 18 Drawing Sheets

(56) References Cited

U.S. PATENT DOCUMENTS

| | | | |
|---|---|---|---|
| 5,906,254 A | 5/1999 | Schmidt et al. | |
| 6,367,786 B1 | 4/2002 | Gutierrez et al. | |
| 10,236,109 B1 | 3/2019 | Robertson | |
| 2006/0169557 A1 | 8/2006 | Goetchius | |
| 2010/0307877 A1 | 12/2010 | Bose et al. | |
| 2013/0328337 A1 | 12/2013 | Melcher et al. | |
| 2014/0008162 A1 | 1/2014 | Carcaterra et al. | |
| 2015/0198216 A1 | 7/2015 | Koyama et al. | |
| 2017/0058984 A1 * | 3/2017 | Griffin | E04H 9/0215 |
| 2019/0154108 A1 | 5/2019 | Inoue et al. | |

FOREIGN PATENT DOCUMENTS

| | | | | |
|---|---|---|---|---|
| DE | 19823716 A1 | 12/1999 | | |
| DE | 102010037922 A1 * | 4/2012 | | F16K 31/082 |
| DE | 102012200697 A1 | 7/2013 | | |
| EP | 0790180 A1 | 8/1997 | | |
| EP | 4040008 A1 | 8/2022 | | |
| FR | 2339107 A1 | 1/1977 | | |
| FR | 2416839 A1 | 9/1979 | | |
| KR | 101184284 B1 * | 9/2012 | | F16F 7/1011 |
| WO | 2016064677 A1 | 4/2016 | | |
| WO | 2019211488 A1 | 11/2019 | | |
| WO | 2022129864 A1 | 6/2022 | | |
| WO | 2023041897 A1 | 3/2023 | | |
| WO | 2023041898 A1 | 3/2023 | | |

OTHER PUBLICATIONS

DE-102010037922-A1: English Machine Translation (Year: 2012).*

International Search Report and Written Opinion received for PCT/GB2022/052304. Mailed: Jan. 5, 2023. 14 pages.

GB Search Report under Section 17 received for GB Application No. 2212591.8, dated Feb. 16, 2023. 1 pages.

Extended European Search Report received for EP Application No. 21275131.7, dated Apr. 4, 2022. 10 pages.

GB Search Report under Section 17(5) received for GB Application No. 2113181.8, dated Jan. 21, 2022. 3 pages.

International Search Report and Written Opinion received for PCT/GB2022/052303. Mailed: Jan. 5, 2023. 14 pages.

* cited by examiner

RESONATOR, RESONATOR ARRAY, VIBRATION CONTROL SYSTEM AND METHOD

FIELD

The present invention relates to a resonator, a resonator array comprising a plurality of resonators, a vibration control system comprising a resonator, and associated vehicles, structures and methods.

BACKGROUND

The vibrations of heavy machinery, for example engines, during their operation can have an adverse effect on the bodies or structures on which said machinery is mounted. For example, the vibration of an engine mounted in vehicles including aircraft, watercraft and land-going vehicles, can impact vehicle efficiency, accuracy of instrumentation, vehicle noise, and stability.

Vibration control systems are desirable in many settings in order to mitigate the impact of the vibration. Vibration control systems provide a level of damping or operate to reduce the impact of vibrations. Some vibration control systems can also simultaneously harvest the kinetic energy from the vibrations and store it for later use. However, commercially available systems are complex, over-sized, or provide insufficient control or damping. This may be due to issues relating to the components, for example resonators, employed in said vibration control systems.

SUMMARY

According to a first aspect of the present invention, there is provided a resonator comprising: a base attachable to an external body; a control element; and one or more connection elements each having a resilient spiral portion, wherein the control element is resiliently connected to the base by the one or more connection elements such that relative movement between the control element and the base is facilitated by the one or more connection elements.

In one example, the resonator comprises an odd number of connection elements.

In one example, the resonator comprises a plurality of connection elements, preferably three connection elements.

In one example, the one or more connection elements each connect to the control element at a point of connection, wherein the points of connection are equidistantly spaced.

In one example, the control element extends around at least a part of the one or more connection elements when the connection elements are in an equilibrium position.

In one example, at least a part of the one or more connection elements and the control element are located in the same plane in an equilibrium position.

In one example, the spiral portion of each connection element spirals in the same direction.

In one example, each connection element has an axis along which the spiral portion is displaceable to provide relative displacement between the control element and the base.

In one example, the control element comprises a proof-mass, optionally wherein the control element has an annular form.

In one example, the base has an annular form.

In one example, the connection element is connected to the control element at an angle away from normal.

In one example, the total number of points of connection between the or each connection element and the control element is three.

In one example, each connection element comprises a support on which the resilient spiral portion is mounted.

In one example, the control element is connected only to the one or more connection elements.

According to a second aspect of the present invention, there is provided a resonator array comprising: a plurality of resonators according to the first aspect of the present invention.

In one example, in the resonator array, the bases of the resonators are connected by a framework.

In one example, two or more of the plurality of resonators have: the same resonance frequency; and/or different resonance frequencies.

According to a third aspect of the present invention, there is provided a vibration control system comprising: a resonator according to the first aspect of the present invention, or a resonator array according to the second aspect of the present invention.

In one example, the vibration control system comprises a driving mechanism for providing a displacing force.

In one example, the vibration control system comprises a tuning mechanism for tuning the resonator.

According to a fourth aspect of the present invention, there is provided a vehicle or structure comprising a resonator according to the first aspect of the present invention, a resonator array according to the second aspect of the present invention and/or a vibration control system according to the third aspect of the present invention. The vehicle may be an aircraft, watercraft or land-going vehicle.

According to a fifth aspect of the present invention, there is provided a method of controlling vibration comprising: using a resonator according to the first aspect of the present invention, a resonator array according to the second aspect of the present invention and/or a vibration control system according to the third aspect of the present invention to control vibration of a body.

In one example, the method comprises configuring the resonator, resonator array and/or vibration control system to have a resonance frequency which corresponds with a target frequency of a situation in which the resonator is to be employed.

According to a sixth aspect of the present invention, there is provided a method of manufacturing a resonator according to the first aspect of the present invention, a resonator array according to the second aspect of the present invention and/or a vibration control system according to the third aspect of the present invention comprising manufacturing the resonator, resonator array and/or vibration control system to have a resonance frequency which corresponds with a target frequency of a situation in which the resonator, resonator array and/or vibration control system is to be employed.

According to a seventh aspect of the present invention, there is provided a vehicle or structure comprising: a source of vibration; and a resonator according to the first aspect of the present invention, a resonator array according to the second aspect of the present invention and/or a vibration control system according to the third aspect of the present invention. In one example, the source of vibration is provided by the vehicle or structure. In one example, the source of vibration is provided by a driving mechanism.

According to an eighth aspect of the present invention, there is provided a vibration control system comprising: a resonator comprising: a base attachable to an external body;

a control element; and one or more connection elements each having a resilient portion, wherein the control element is resiliently connected to the base by the one or more connection elements such that relative movement between the control element and the base is facilitated by the one or more connection elements; and a driving mechanism, wherein the resonator comprises at least a part of the driving mechanism.

In one example, one or more of the resilient portions is a resilient spiral portion. In one example, each resilient portion is a resilient spiral portion.

In one example, at least a part of the driving mechanism is provided on the resonator.

In one example, the driving mechanism is operable to tune the resonator. In one example, the driving mechanism is operable as a tuning mechanism or tuning assembly for tuning the resonator.

In one example, the driving mechanism is operable to provide an actuating force to the resonator. In one example, the driving mechanism is operable as an actuating mechanism or actuating assembly for providing an actuating force to the resonator.

In one example, wherein the driving mechanism comprises one or more piezoelectric elements.

In one example, the one or more piezoelectric elements are attached to and/or embedded in the one or more connection elements. In one example, the one or more piezoelectric elements are for modifying a stiffness of the one or more connections elements.

In one example, the driving mechanism comprises an electromagnetic actuator.

In one example, the electromagnetic actuator comprises a solenoid and one or more permanent magnets. In one example, the solenoid is provided at the base, and the one or more permanent magnets are provided at the control element. In one example, the solenoid is provided at the control element, and the one or more permanent magnets are provided at the base.

In one example, the solenoid is comprised in the base, and the one or more permanent magnets are comprised in the control element. In one example, the solenoid is comprised in the control element, and the one or more permanent magnets are comprised in the base.

In one example, the resonator comprises a magnetorheological elastomer and/or an electrorheological elastomer, and the driving mechanism further comprises a magnetic field generating unit and/or an electric field generating unit.

In one example, the vibration control system further comprises a sensing mechanism.

In one example, the sensing mechanism comprises one or more piezoelectric elements.

In one example, the resonator comprises a plurality of connection elements, preferably an odd number of connection elements, most preferably three connection elements.

In one example, the one or more connection elements each connect to the control element at a point of connection, wherein the points of connection are equidistantly spaced.

In one example, the vibration control system further comprises a resonator array comprising: a plurality of resonators, each resonator comprising: a base attachable to an external body; a control element; and one or more connection elements each having a resilient portion, wherein the control element is resiliently connected to the base by the one or more connection elements such that relative movement between the control element and the base is facilitated by the one or more connection elements, optionally wherein the bases of the resonators are connected by a framework.

According to a ninth aspect of the present invention, there is provided a vehicle or structure comprising: a source of vibration; and a vibration control system according to the eighth aspect of the present invention.

According to a tenth aspect of the present invention, there is provided a method of controlling vibration comprising: using a vibration control system according to the eighth aspect of the present invention to control vibration of an external body.

In one example, the method comprises operating the driving mechanism to cause the resonator or resonator array to have a resonance frequency which corresponds with a target frequency of a situation in which the vibration control system is to be employed.

According to an eleventh aspect of the present invention, there is provided a method of manufacturing a vibration control system according to the eighth aspect of the present invention, the method comprising: providing: a resonator comprising: a base attachable to an external body; a control element; and one or more connection elements each having a resilient portion, wherein the control element is resiliently connected to the base by the one or more connection elements such that relative movement between the control element and the base is facilitated by the one or more connection elements; providing a driving mechanism, wherein the resonator comprises at least a part of the driving mechanism.

It will of course be appreciated that features described in relation to one aspect of the present invention may be incorporated into other aspects of the present invention. Other preferred and advantageous features of the invention will be apparent from the following description.

BRIEF DESCRIPTION OF THE FIGURES

Embodiments of the invention will now be described by way of example only with reference to the figures, in which.

DETAILED DESCRIPTION

Figure 1:
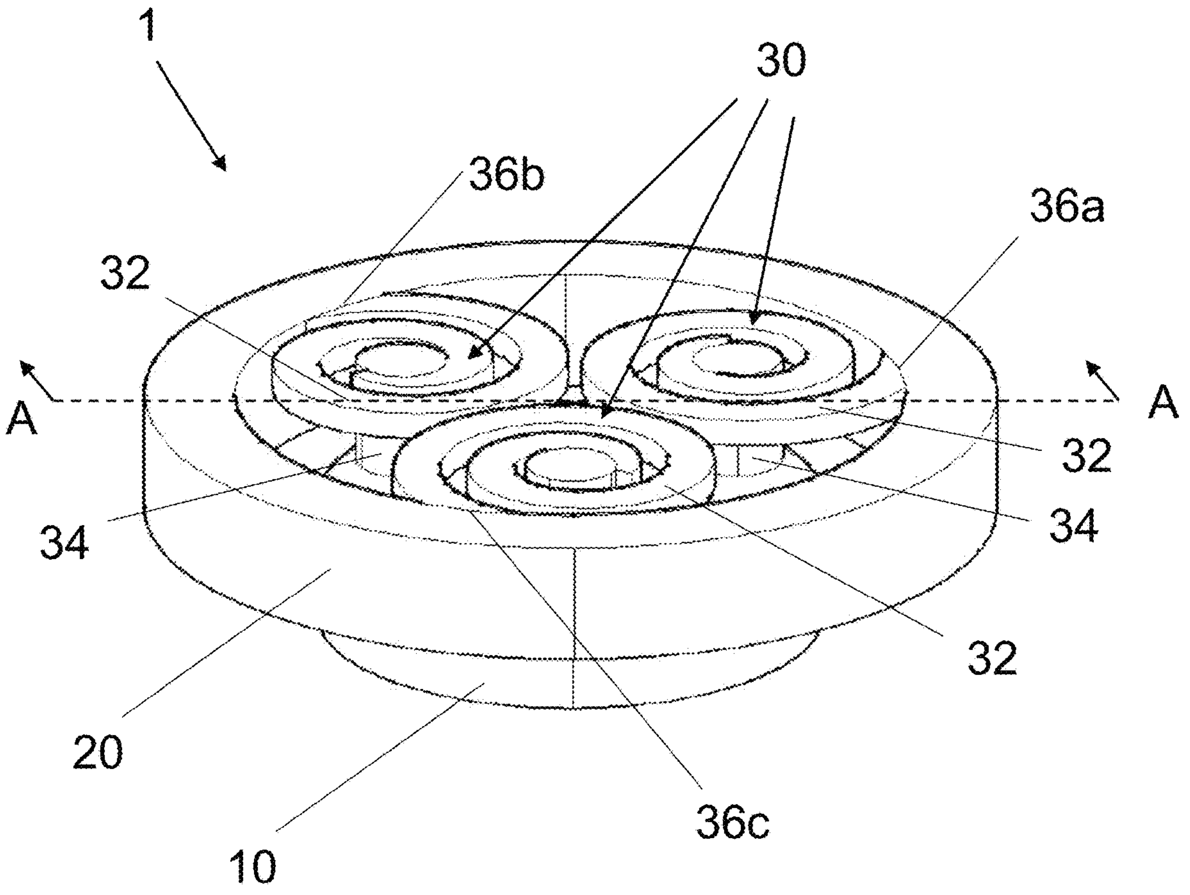
FIG. 1 shows a perspective view of a resonator.
Figure 2:
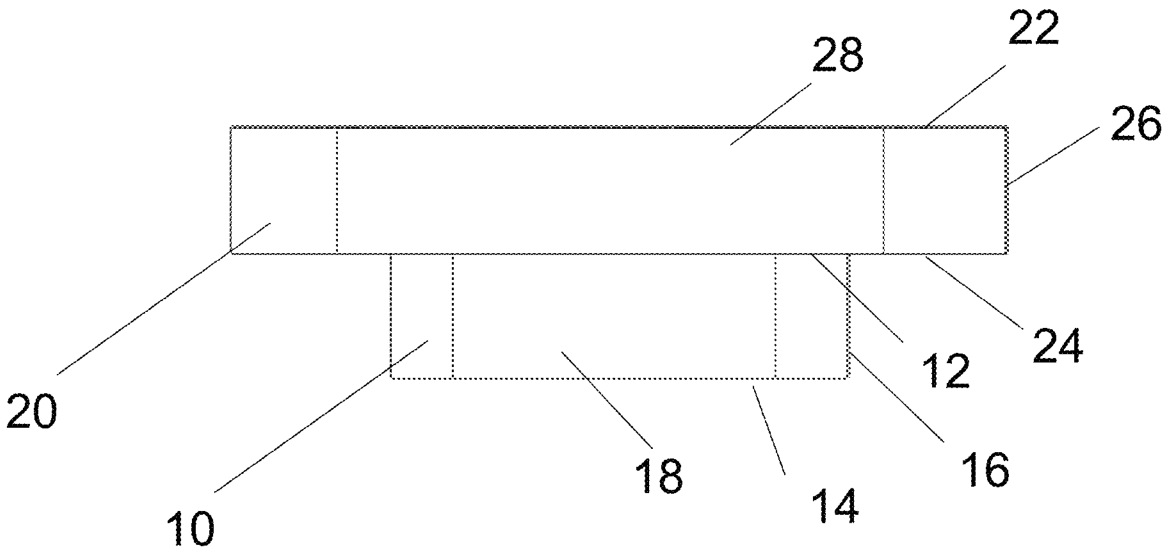
FIG. 2 shows a side view of the resonator of FIG. 1 in cross section along the line A-A in the direction of the arrows.

Referring to the figures, a resonator 1 is shown.

The resonator 1 is a component which is arranged to move (including vibrate or oscillate) when acted upon (for example, driven) by, or in response to, an external force. The resonator 1 is attachable to an external body. Vibration of the external body applies an external force on the resonator 1 which induces vibration of the resonator 1 Vibration of the resonator 1 thereby results in the application of a force on the external body to which the resonator 1 is attached. The force applied by the resonator 1 on the external body acts to control, or effect, the vibration of the external body. As a result, the resonator 1 may be described as a vibration control component.

The resonator 1 is arranged to move with a maximum amplitude at a resonance frequency. However, it will be understood by the skilled person that benefits of the invention may still be obtained when the resonator 1 is not operated at a resonance frequency. In such use cases, the movement of the resonator 1 is less than a maximum amplitude but may still be significant such that vibration control is achieved. Nevertheless, the resonator 1 may be configured to have a resonance frequency which corresponds to a target frequency of a situation in which the resonator 1 is to be employed. That is, the resonator 1 is configured to have a resonance frequency which corresponds with a frequency of vibration of an external body to which the resonator 1 is to be attached, or to which the external body is to be exposed.

Referring to FIGS. 1 to 4, the resonator 1 comprises a base 10. The base 10 is attachable to an external body. As will be described in further detail herein, the external body may be, for example, a part of: a vibration control system; a framework; a vehicle and/or a structure. The base 10 has an annular form having a top surface 12, a bottom surface 14, an outer side surface 16 and an inner side surface 18. Advantageously, the base 10 providing an inner side surface facilitates attachment to an external body, which in this embodiment is by virtue of its annular form. Other forms may also facilitate attachment of the base 10 to an annular body, for example a disc, or a solid form comprising a recess or an aperture extending therethrough.

The resonator 1 further comprises a control element 20. In this example, the control element 20 is a passive control element in the form of a proof-mass (which may alternatively be referred to as a mass member). By providing such a control element 20, a robust and simplified resonator 1 is provided. The mass (and perhaps even shape) of the proof-mass can be selected to adjust the resonance frequency of the resonator 1. For example, different masses could be used for different applications, or scenarios. The control element 20 has an annular form having a top surface 22, a bottom surface 24, an outer side surface 26 and an inner side surface 28.

The resonator 1 further comprises one or more connection elements 30. The control element 20 is resiliently connected to the base 10 by the one of more connection elements 30. In this way, relative movement between the control element 20 and the base 10 is facilitated by the one or more connection elements 30. The control element 20 is contacted only by the one or more connection elements 30. In this way, the control element 20 is able to move by virtue of the resilient connection to the base 10 via the connection elements 30. Such a construction provides for a simplified resonator construction.

Figure 3:
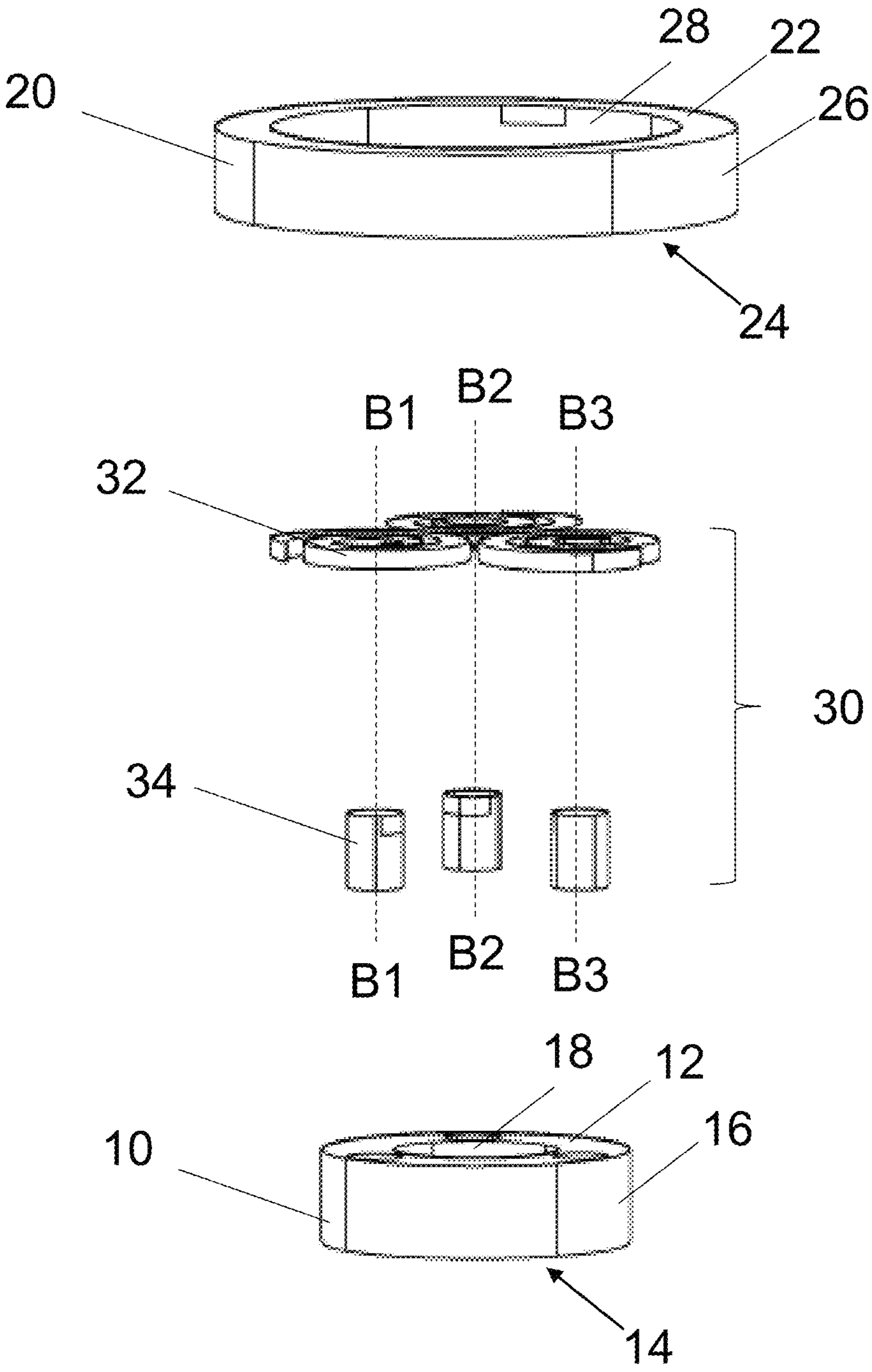
FIG. 3 shows an exploded view of the resonator of FIG. 1.
Figure 4:
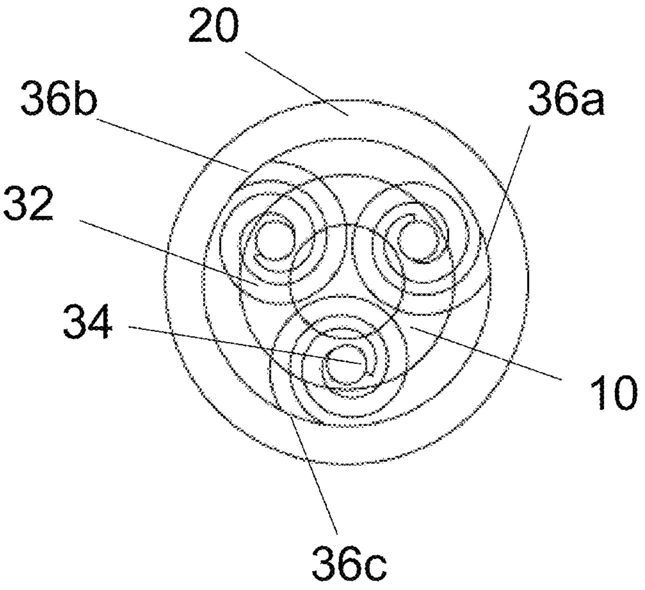
FIG. 4 shows a plan view of the resonator of FIG. 1.

A key feature is that each connection element 30 has a resilient spiral portion 32. Advantageously, a spiral shaped connection element exhibits lateral stability. Moreover, a spiral portion 32 is a compact construction which facilitates displacement of the connection element and resilient connection of the base 10 and control element 20. That is, the spiral portion 32 is compact in comparison to, say, a helix-like structure of constant radius (e.g. a coil spring). The spiral portion 32 winds in a continuous and gradually widening curve around a central point on a flat plane, when the connection element 30 is in an equilibrium position. When the connection element 30 is out of equilibrium, for example when the resonator 1 is exhibiting movement, the spiral portion 32 may take the form of, or trace along an outer virtual surface or path of, a cone, as the winding of the spiral portion 32 is about an axis, for example the axes B1-B1, B2-B2 and B3-B3 as shown in FIG. 3. That is, each connection element 30 has an axis along which the spiral portion 32 is displaceable to provide relative displacement between the base 10 and the control element 20. That is, when the resonator 1 is exhibiting movement, the spiral portion 32 may stretch. or deform, vertically upwards and vertically downwards relative to its equilibrium position in an alternate, oscillatory, manner. The spiral portion 32 exhibits axial movement. In some embodiments, the equilibrium position may be such that the spiral portion 32 has a conical form, rather than flat as illustrated in the figures. However, the spiral portion 32 having a flat form in an equilibrium position is beneficial in achieving stability, predictability of movement, and also in simplifying manufacture of the spiral portion 32 (in particular when additive manufacture is employed.

The spiral portion 32 is a curve of decreasing radius, which results in a compact form and desirable performance. The spiral could be formed of one or more linear portions, or different connected sub-portions. This might still offer benefits, in terms of a general spiral form. However, a curve of decreasing radius will likely have better or more easily predictable/controllable performance, in terms of vibrational modes.

Each connection element 30 further comprises a support 34 in the form of an elongate rod or extension. Each support 34 extends along respective axis B1-B1, B2-B2, B3-B3. Each support 34 connects at a first end to the respective connection element 30 at a central point, or region. The first end is an uppermost end of the support 34. The spiral portion 32 spirals, or winds, outwardly in a plane at the uppermost end of the support 34. Each support 34 connected at a second, opposite, end to the top surface 12 of the base 10. The second end is a lowermost end of the support 34.

In one exemplary embodiment, the control element 20 and connection elements 30 are formed as a one-piece construction. The control element 20 and connection elements 30 may be formed by additive layer manufacturing (ALM) or by injection moulding. In another exemplary embodiment, the base 10, control element 20 and connection elements 30 are all formed as a one-piece construction. Again, ALM or injection moulding may be used as a manufacturing process.

In one exemplary embodiment, the control element 20 forms part of the connection element 30, and an outer region of the spiral portion 32 provides the control element 20. Such a construction may be described as an integrated control element 20 and connection element 30. ALM or injection moulding may be employed as a manufacturing process to provide an integrated control element 20 and connection element 30. However, in the embodiment shown in the figures, the control element 20 is a separate component to the connection elements 30 and is subsequently connected thereto.

The resonator 1 comprises three connection elements 30. Advantageously, by providing a plurality of connection elements 30, stability of the control element 20 is achieved. Three connection elements 30 have been found as an optimum balance of size or footprint of the resonator 1 and stability of the resonator 1. That is, providing a plurality of connection elements 30, particularly three connection elements 30, prevents the control element 20 from rocking (i.e. exhibiting movement in a non-vertical axis, that is, an axis which is not parallel to the B-B axes).

Many of the above advantages, e.g. in terms of stability, may be true of any odd number (greater than one) of connection elements, but three elements strikes the balance multiple requirements (e.g. size, compactness, stability). A free end of the spiral portion 32 of each of the three connection elements 30 connects to the control element 20 at a point, or region, of connection 36*a*, 36*b*, 36*c*. Each point of connection 36*a*-36*c* is at the inner side surface 28 of the control element 20. The three points of connection are equidistantly spaced along the inner side surface 28. Stability and predictability of the resonator response is improved by providing equidistantly spaced points of connection, even more so when there are an odd number of points. The spiral portion 32 of each connection element 30 spirals, or winds, in the same direction. Not only does this provide a simpler construction, but might also balance the resistive forces of the connection elements 30 to lateral displacements of the control element 20.

The free end of the spiral portion 32 of each connection element 30 connects to the control element 20 at an angle away from normal. That is, the free end of the spiral portion 32 does not abut the inner side surface 28 of the control element 20 perpendicularly, but rather connects or adjoins at an angle. In this way, by the connection elements 30 connecting to the control element at an angle, there is a reduced probability of the control element 20 and connection element 30 being broken apart due to the vibrational forces to which the resonator 1 is subjected.

The control element 20 extends around the spiral portion 32 of the one or more connection elements 30 when the resonator 1 is in an equilibrium position. That is, when the resilient connection elements 30 are not displaced from equilibrium, the control element 20 extends around the connection elements 30. In this way, the control element 20 encompasses the one or more connection elements 30. Such a construction improves the stability of the resonator 1, whilst ensuring it has a compact spatial footprint.

The control element 20 and the spiral portions 32 of the one or more connection elements 30 are located in the same plane in an equilibrium position. That is, when the resilient connection elements 30 are not displaced from equilibrium, a horizontal plane intersects the spiral portions 32 and the control element 20. Such a construction improves the stability of the resonator 1, whilst ensuring it is spatially compact.

Figure 5:
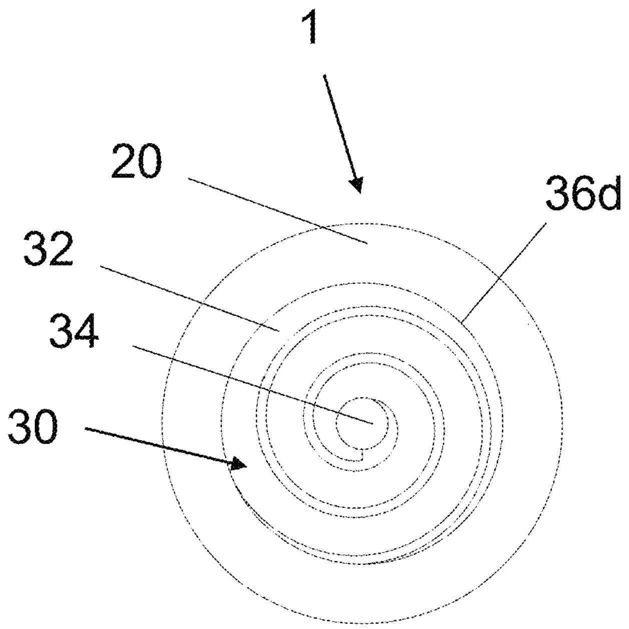
FIG. 5 show a plan view of a control element and connection element.

Referring to FIG. 5, the resonator 1 comprises a base 10 (not shown) and a control element 20. However, in this illustrated embodiment, the resonator 1 comprises a single (i.e. one) connection element 30. The connection element 30 connects to the control element 20 at a point, or region, of connection 36*d*. The point of connection 36*d* is at the inner side surface 28 of the control element 20. Advantageously, a resonator 1 incorporating only a single connection element 30 is a lightweight and simple to manufacture construction. It will be understood that issues with stability may be noticeable, and so a plurality of connection elements 30 may be preferred. However, the lack of stability may be mitigated by connecting the single connection element 30 to the control element 20 at a plurality of points along the inner side surface 28 of the control element 20, or along a region 36*d* of the control element 20 as is shown in the figure. It will be understood by the skilled person that all the features of the embodiments having a plurality of connection elements 30 could be included in the embodiment having one connection element 30.

In all embodiments (i.e. irrespective of the number of connection elements) the resonator 1 can be tuned by adjusting or selecting the mass of the control element 20, or by selecting an appropriate thickness of the one or more connection elements 30. That is, the mass of the control element 20 or thickness of the one or more connection elements 30 will relate to the resonance frequency of the resonator 1. It is desirable to provide a resonator 1 having a resonance frequency that is suited to the situation in which the resonator 1 is to be employed. It is often beneficial to match the resonance frequency of the resonator 1 with a frequency or frequencies of vibration of an external body that it is desired to control the vibration of, or to a vibration that the resonator is to be exposed to (e.g. environmental, for damping or harvesting).

Figure 6A:
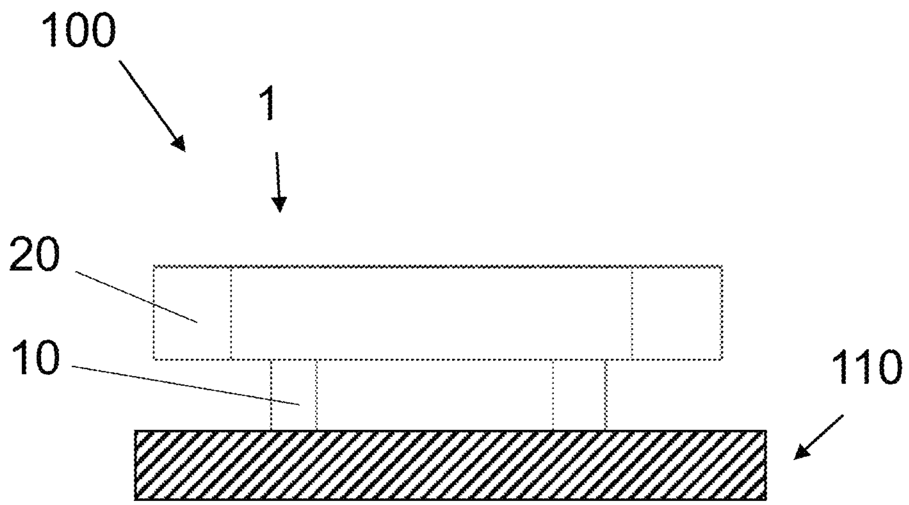
FIGS. 6*a* and 6*b* shows a side view of the resonator of FIG. 1 attached to external bodies.
Figure 6B:
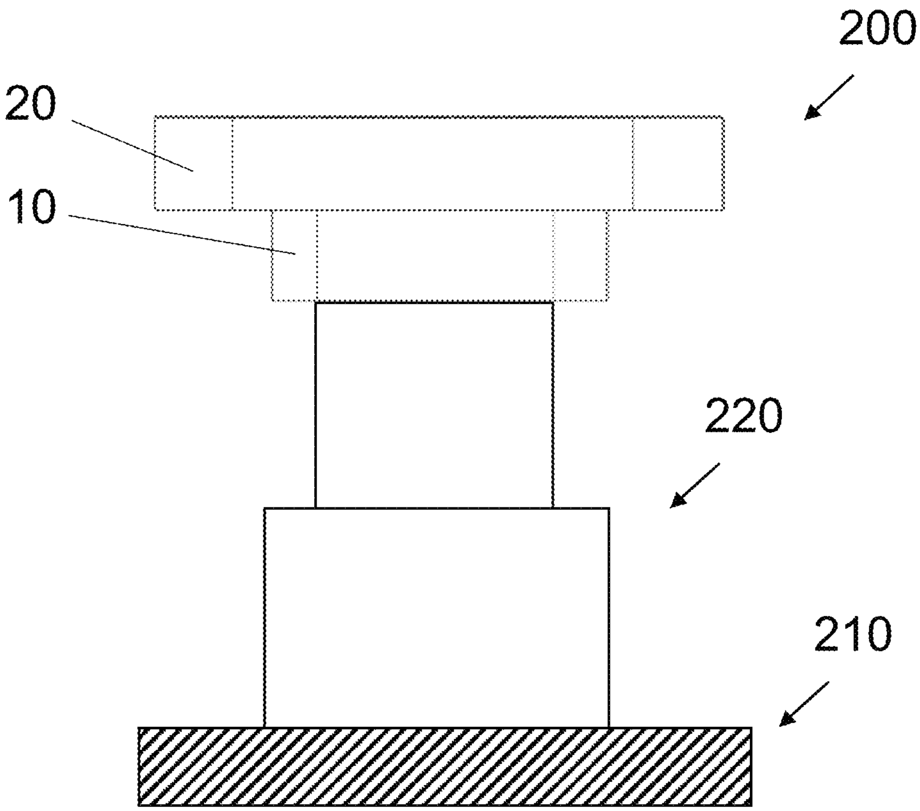
Figure 7:
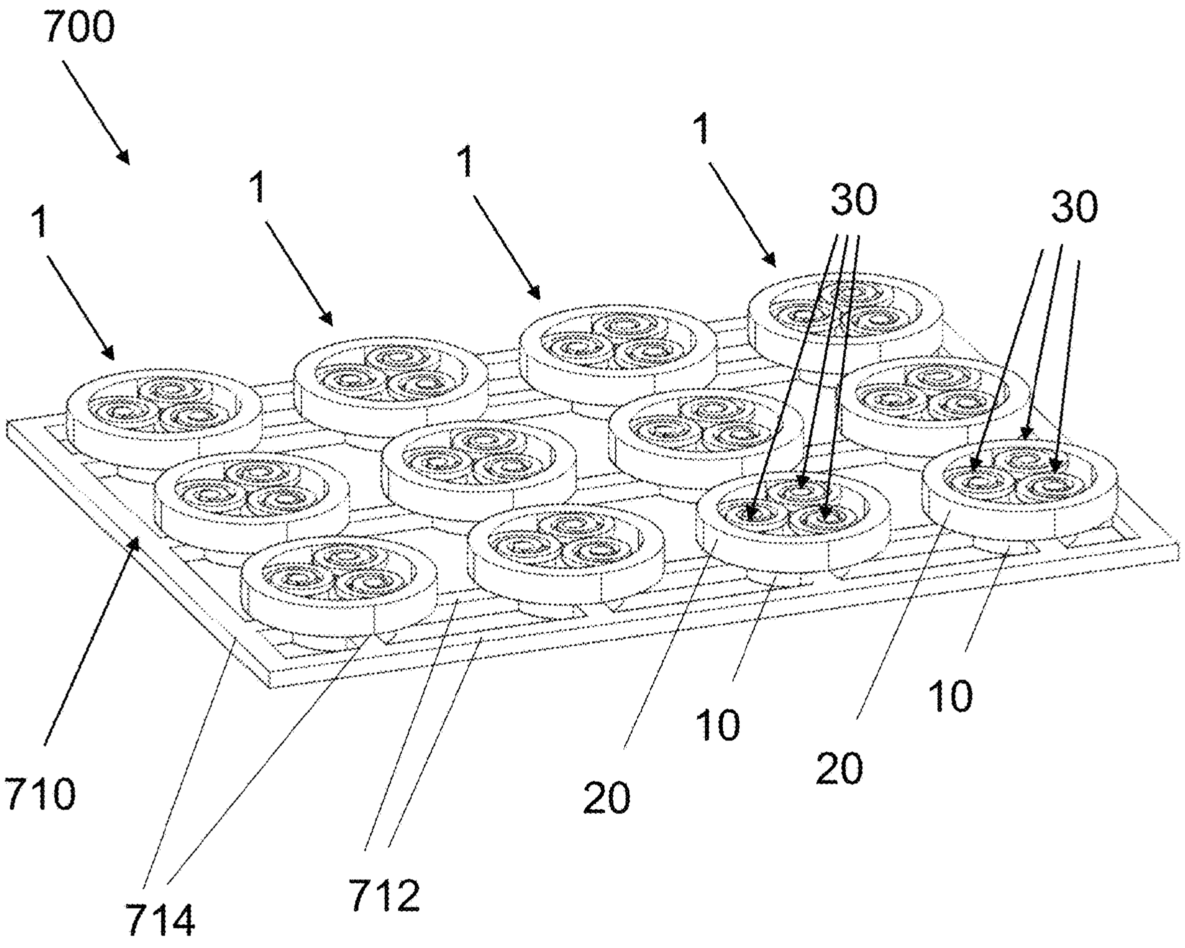
FIG. 7 shows a resonator array.

Referring to FIGS. 6*a* and 6*b*, in one exemplary embodiment, the resonator 1 is a vibration control component for a vibration control system (indicated generally at 100, 200). The vibration control system 100, 200 is a system for controlling vibrations of a vibrating external body. A part of the external body, such as a panel, is indicated at 110 and 210. In an exemplary embodiment, the vibration control system 100, 200 is configured to operate as an energy harvester, and comprises the necessary componentry to provide energy harvesting functionality. In another exemplary embodiment, the vibration control system 100, 200 comprises a driving mechanism for controlling vibrations by providing a driving force, such as an actuator 220. In this way, external vibrations can be controlled by destructive interference of the vibration of the resonator 1 and the vibration of an external body to which the resonator is directly or indirectly attached. The energy harvesting components, or mechanism, or driving mechanism, can operate as a tuning mechanism for tuning the resonator, by, for example, tuning the resonance frequency of the resonator 1. The apparatus of the vibration control system 100, 200 (for example, energy harvesting apparatus and/or driving apparatus) may be incorporated (i.e. integral) in the resonator 1. The driving mechanism may provide a source of vibration. Alternatively, or additionally, the vehicle or structure itself may provide the source of vibration Referring to FIG. 7, a resonator array 700 is shown. The resonator array 700 comprises a plurality of resonators 1. The resonator array 700 further comprises a framework 710 comprising a set of first framework members 712 and a set of second framework members 714. The first framework members 712 and second framework members 714 extend perpendicularly to one another. The first framework members 712 and second framework members 714 connect to the bases 10 of the resonators 1, and thereby connect the bases 10 of the resonators 1 to one another in an array formation. A base 10, or bases, of the plurality of resonators 1 can be attached to an external body. Vibration of the external body thereby causes all resonators of the resonator array 700 to vibrate. It will be understood by the skilled person that the framework 710 may instead be attached to an external body, and vibration of the external body will cause the resonators 1 to vibrate by virtue of the connection of the resonators 1 to the framework 710.

A plurality of the resonators 1 of the resonator array 700 have the same resonance frequency. This is achieved by the said plurality of resonators 1 having an identical construction, for example identical control elements 20 and identical connection elements 30. In this way, the resonator array 700 is configured to control vibrations of an external body which is known to vibrate at the resonance frequency. Advantageously, in this way the resonator array 700 is configured to control a specific, single, vibrational frequency of the external body.

In another exemplary embodiment, a plurality of the resonators 1 of the resonator array 700 have different resonance frequencies. This is achieved by the said plurality of resonators 1 having different constructions, for example different control elements 20 (i.e. different masses) and/or different connection elements (i.e. formed from different materials or having different thicknesses). In this way, the resonator array 700 may be configured to control a plurality of modes of vibration of an external body. Advantageously, in this way the resonator array 700 is designed to control a plurality of vibrational frequencies of the external body.

Figure 8:
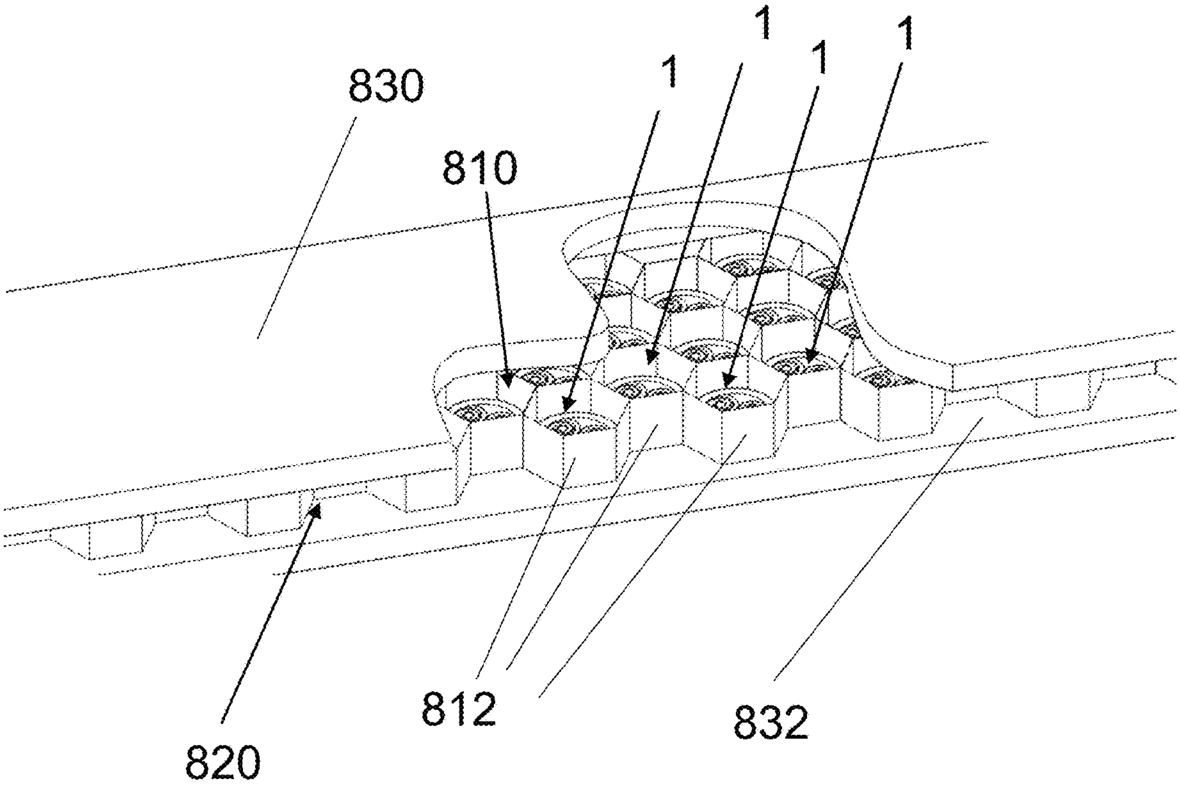
FIG. 8 shows a pocketed resonator array.

Referring to FIG. 8, a resonator array 800 is shown. The resonator array 800 comprises a plurality of resonators 1. In the illustrated embodiment. the resonator array 800 is an array of unconnected resonators 1. Here, the plurality of resonators are not connected by a framework, such as that described above. Alternatively, the resonator array 800 may be an array of resonators 1 connected by a framework.

The resonator array 800 comprises a cell structure 810. The cell structure 810 may be alternatively described as a pocket structure. The cell structure 810 comprises an array of cells 812 or "pockets". Each cell 812 surrounds a resonator 1. In this way, movement of the surrounded, or "pocketed", resonator 1 is restricted to a single axis, which in this exemplary embodiment is a vertical axis. Advantageously, the vibration of the resonator 1 can be guided so as to provide a more predictable vibrational response, and furthermore, the resonators 1 are protected by the cell structure 810. The same or similar pocketing is, of course, true of any air or other medium in each 812, which might simple improve performance (in addition to, or separate from, any restriction of movement of the resonator 1).

In the illustrated embodiment, the resonator array 800 having cell structure 810 is provided in a cavity 820 in a panel 830. The base 10 of each resonator 1 is attached to an inner surface 832 of the panel 830. Vibrations of the panel 830 cause the resonators 1 to move, and the resonators 1 have a damping effect on the vibrations of the panel 830.

Figure 9A:
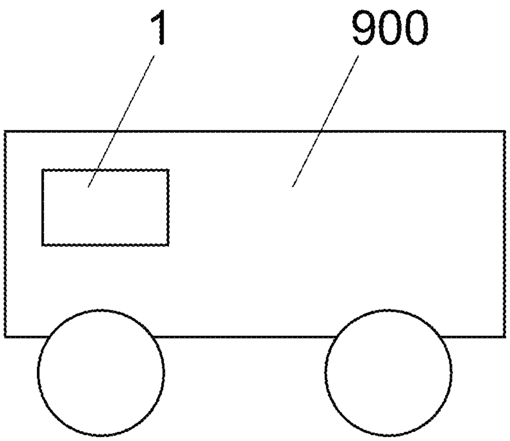
FIGS. 9*a* and 9*b* shows a vehicle and structure.
Figure 9B:
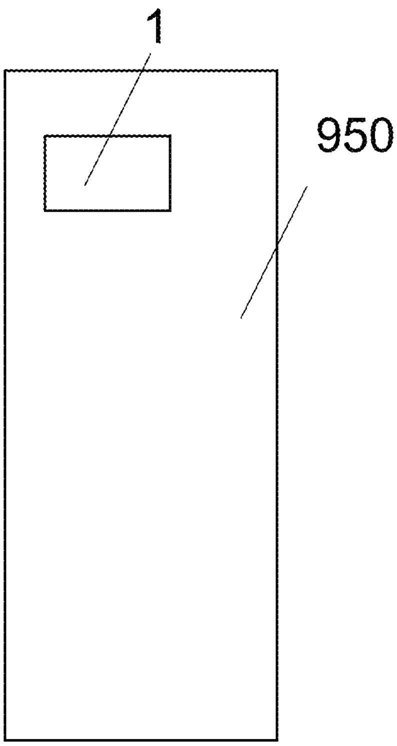

Referring to FIG. 9*a*, a vehicle 900 is shown. The vehicle comprises a resonator 1. The vehicle 900 may alternatively or additionally comprise a resonator array 700, 800, or a vibration control system 100, 200, as described above. Referring to FIG. 9*b*, a structure 950 is shown. The structure 950 comprises a resonator. The structure 950 may alternatively or additionally comprise a resonator array 700, 800, or a vibration control system 100, 200, as described above.

Figure 10:
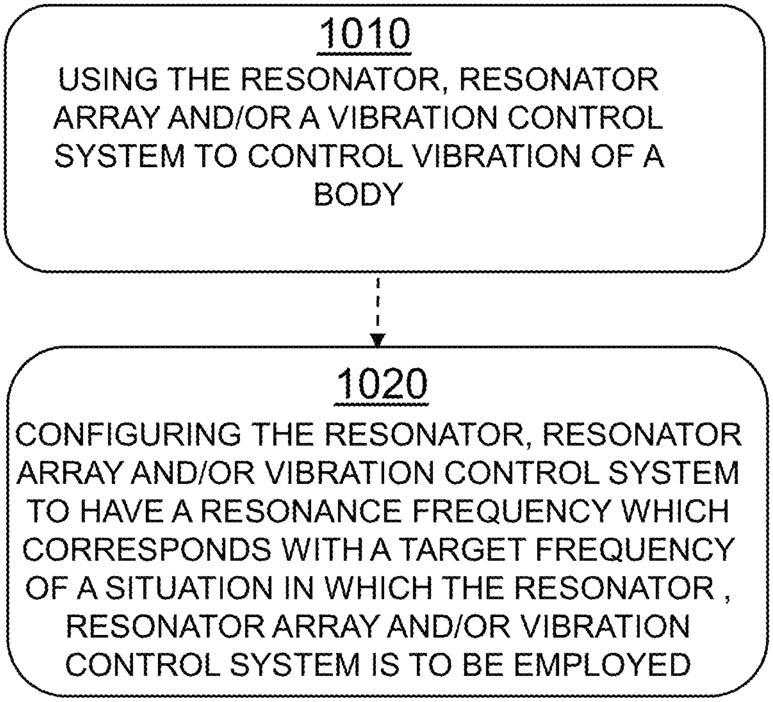
FIG. 10 shows general methodology principles.

Referring to FIG. 10, a method of controlling vibration is illustrated. Step 1010 comprises using a resonator to control vibration of a body. A further, optional, step 1020 comprises configuring the resonator to have a resonance frequency which corresponds with a target frequency of a situation in which the resonator is to be employed.

Figure 11:
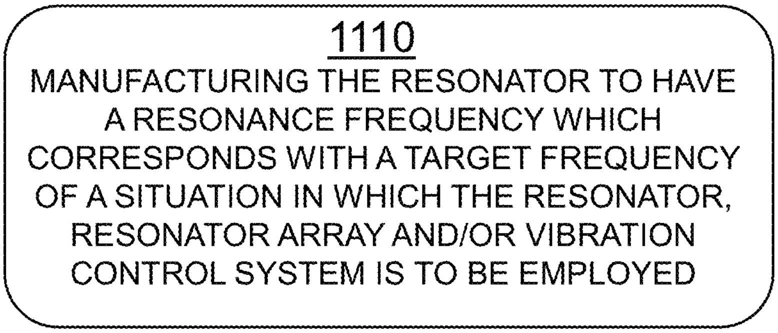
FIG. 11 shows general methodology principles

Referring to FIG. 11, a method of manufacturing a resonator is illustrated. Step 1110 comprises manufacturing the resonator to have a resonance frequency which corresponds with a target frequency of a situation in which the resonator is to be employed. A further, optional, step comprises manufacturing the base 10, control element 20 and/or the connecting element 30 by additive layer manufacturing or injection moulding. Two or more of the base 10, control element 20 and the connecting element 30 can be manufactured as a one-piece construction.

The vibration control system 100, 200 introduced above with reference to FIGS. 6*a* and 6*b* will be herein described in greater detail. The vibration control system in general is given the numeral 1000. The vibration control system 1000 may comprise, include, or incorporate, any or all of the features of the vibration control system 100, 200 introduced above.

Figure 12:
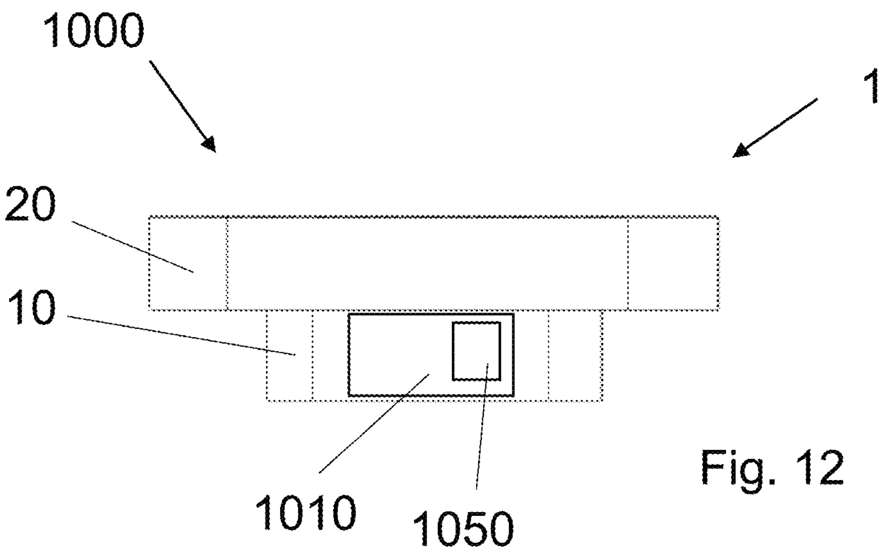
FIG. 12 shows a vibration control system comprising a driving mechanism.

Referring to FIG. 12, the vibration control system 1000 is shown. The vibration control system 1000 comprises a resonator 1. The resonator 1 comprises a base attachable to an external body; a control element; and one or more connection elements each having a resilient portion, wherein the control element is resiliently connected to the base by the one or more connection elements such that relative movement between the control element and the base is facilitated by the one or more connection elements.

Figure 13:
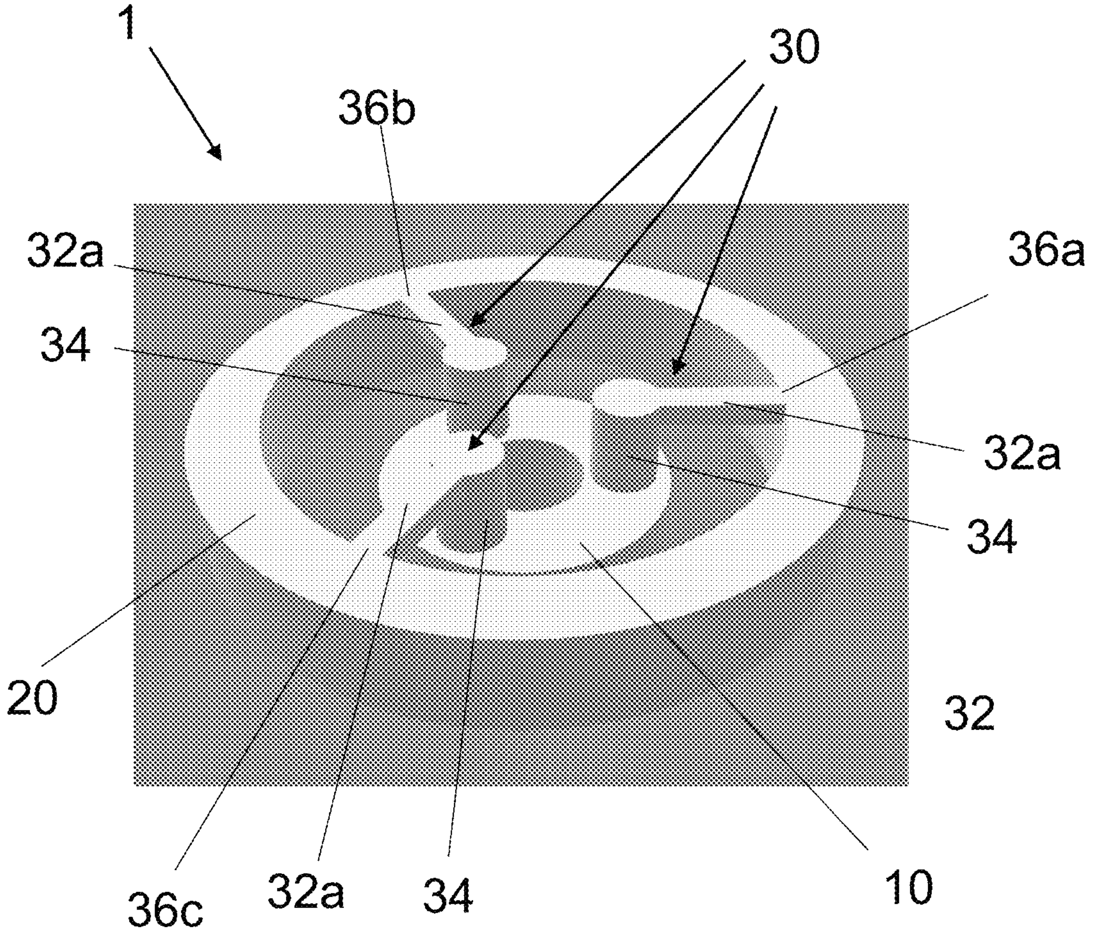
FIG. 13 shows a perspective view of a resonator.

It will be appreciated that such a resonator 1 is in accordance with the resonator 1 described above with reference to FIGS. 1 to 5. However, as an important distinction, the resonator 1 may have resilient portions of alternative forms to spiral portions 32. That is, the resilient portion may be a resilient straight (e.g., straight spring) portion, or another alternative form. As an example, a resonator 1 comprising resilient straight portions 32*a* is shown in FIG. 13. Corresponding features are given corresponding reference numerals to those of FIGS. 1 to 5. Advantageously, resilient straight portions 32*a* are simple to manufacture, and also may simplify the construction of driving mechanisms (described in detail below) incorporated therein.

In highly advantageous examples of the vibration control system 1000, the resonator 1 comprises a plurality of connection elements 30, preferably an odd number of connection elements 30, most preferably three connection elements 30.

Advantageously, by providing a plurality of connection elements 30, stability of the control element 20 is achieved during driving of the vibration control system 1000 by the driving mechanism 1010. Furthermore, an odd number of connection elements prevents the control element 20 from rocking (i.e. exhibiting movement in a non-vertical axis, that is, an axis which is not parallel to the B-B axes) during driving by the driving mechanism 1010. The driving mechanism 1010 may introduce lateral forces during driving, and so the odd number of connection elements can reduce the negative impact of such forces. Three connection elements 30 have been found as an optimum balance of size or footprint of the resonator 1 and stability of the resonator 1 during driving by the driving mechanism 1010. Many of the above advantages, e.g., in terms of stability, may be true of any odd number (greater than one) of connection elements, but three elements strikes the balance multiple requirements (e.g. size, compactness, stability).

In highly advantageous examples of the vibration control system, in the resonator 1, the one or more connection elements 30 each connect to the control element 20 at a point of connection 36*a-c*, wherein the points of connection are equidistantly spaced. Stability and predictability of the resonator response is improved by providing equidistantly spaced points of connection, even more so when there are an odd number of points, particularly in combination with the driving mechanism 1010. Lateral forces may be introduced during operation of the driving mechanism 1010, and the equidistantly spaced points of connection reduce the negative impact of such lateral forces during driving.

Referring back to FIG. 12, the vibration control system 1000 further comprises a driving mechanism 1010. The resonator 1 comprises at least a part of the driving mechanism 1010. The resonator 1 comprising at least a part of the driving mechanism 1010 is highly advantageous in that the vibration control system 1000 is a robust and compact construction. Furthermore, the driving force can be applied directly at the resonator 1, thus facilitating more precise control of vibrations (including improved control of the stiffness of the resonator 1, leading to improved control of vibrations).

The driving mechanism 1010 may have various constructions and functions. The term "driving mechanism" is used to refer to mechanisms operable to tune the resonator 1, and/or operable to provide an actuating/displacing force to the resonator 1. That is, the driving mechanism 1010 may otherwise be referred to as a tuning mechanism or tuning assembly and/or an actuating mechanism or actuating assembly.

The driving mechanism 1010 may be operable to tune the resonator 1. In this way, the resonance frequency of the resonator 1 may be controlled to correspond to a target frequency of a situation in which the vibration control system 1000 is to be employed. That is, the driving mechanism 1010 may tune the resonator 1 to have a resonance frequency which corresponds with a frequency of vibration of an external body to which the resonator 1 is to be attached, or to which the external body is to be exposed. Tuning the resonator 1 may be by virtue of modifying the stiffness of the connection elements 30, specifically the resilient portions 32, 32*a*. In this way, the response of the resonator to the vibration of an external body to which the vibration control system is connected (and thus the vibration absorbing effect of the resonator 1) can be tuned (e.g., controlled).

The driving mechanism 1010 may be operable to provide an actuating force to the resonator 1. In this way, external vibrations can be controlled by destructive interference of the vibration of the resonator 1 (actuated by operation of the driving mechanism 1010) and the vibration of an external body to which the vibration control system 100 is directly or indirectly attached.

The actuating force, which may be referred to as a displacing force, causes the resonator 1 to vibrate or oscillate at a frequency controlled by the driving mechanism 1010. The control element 20 may oscillate in a vertical direction relative to the base 10 facilitated by the connection elements 30.

The vibration control system 1000 may be operable as a vibration absorber. That is, the vibration control system 1000 may be operable to absorb vibrations of a component or structure to which the vibration control system 1000 is connected (e.g., directly or indirectly attached).

The vibration control system 1000 may further comprise a sensing mechanism 1050. The sensing mechanism 1050 may be configured to sense vibration or movement of an external body to which the vibration control system 1000 is connected. Additionally, or alternatively, the sensing mechanism 1050 may be configured to sense vibration or movement of the resonator 1. The sensing mechanism 1050 may provide feedback, as an output, to the driving mechanism 1010. The driving mechanism 1010 may provide an actuating/displacing force to the resonator 1 based on the output provided by the sensing mechanism 1050.

Advantageously, in this way, feedback may be provided from the sensing mechanism 1050 to the driving mechanism 1010 to facilitate tuning and/or actuating the resonator 1 in an appropriate manner to damp (e.g., absorb) vibrations to which the resonator 1 is subjected.

The sensing mechanism 1050 may be provided by an external mechanism (i.e., one that is not part of the driving mechanism 1010) or alternatively may be provided by the driving mechanism 1010. In a highly advantageous example, the sensing mechanism 1050 comprises one or more piezoelectric elements. Advantageously, piezoelectric elements are highly sensitive to small amplitude vibrations, enabling precise control of the driving mechanism 1010. One part (e.g., assembly of components) of the driving mechanism 1010 may be operable to tune the resonator 1 and/or provide an actuating force to the resonator 1, whilst another part (e.g., assembly of components) of the driving mechanism 1010 may be configured to operate as the sensing mechanism 1050. In a highly advantageous example, piezoelectric elements may be used as the sensing mechanism 1050, whilst other piezoelectric elements and/or an EM actuator is used as the driving mechanism 1010.

Figure 14:
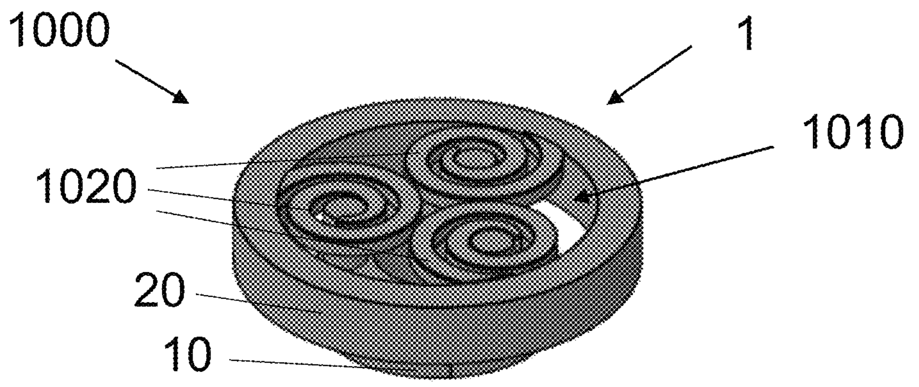
FIG. 14 shows a perspective view of a vibration control system.
Figure 15:
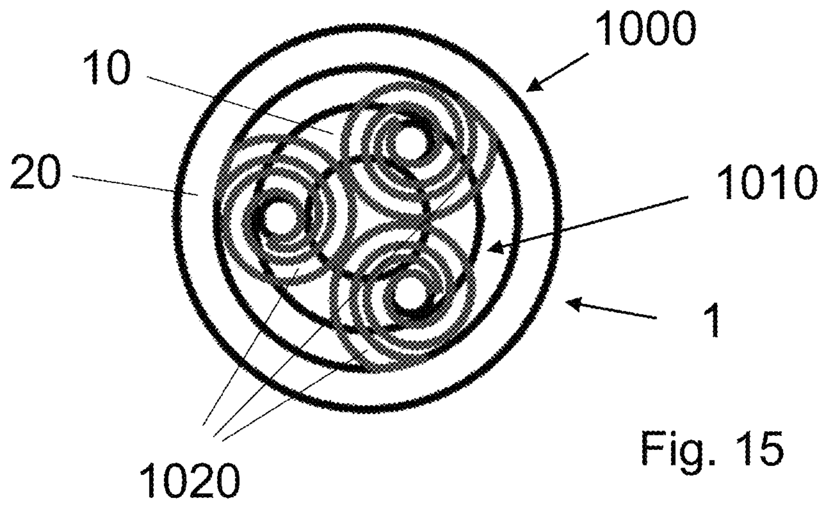
FIG. 15 shows a plan view of the vibration control system of FIG. 14.
Figure 16:
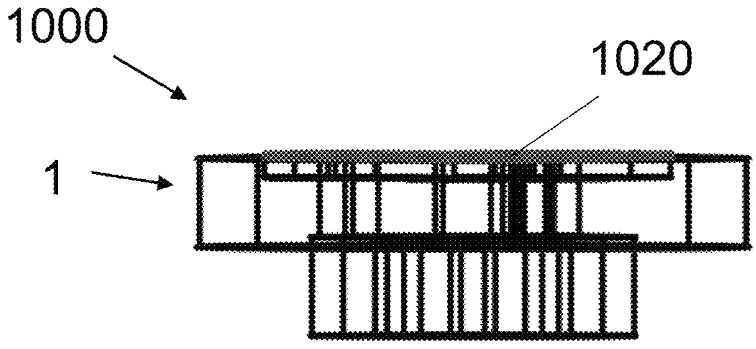
FIG. 16 shows a side cross-sectional view of the vibration control system of FIG. 14.

Referring to FIGS. 14 to 16, a vibration control system 1000 comprising a driving mechanism 1010 according to a first exemplary embodiment is shown. FIG. 14 shows a perspective view of the vibration control system 1000. FIG. 15 shows a plan view of the vibration control system 1000. FIG. 16 shows a side cross-sectional view of the vibration control system 1000.

The driving mechanism 1010 of the first embodiment comprises one or more piezoelectric elements 1020. Advantageously, piezoelectric elements 1020 may facilitate tuning of the resonator by altering the stiffness of the resilient portions 32, 32*a* and/or facilitate the provision of a displacing force to the resonator 1 having a precise amplitude and at a precise point in time. Furthermore, the one or more piezoelectric elements may be operable as the sensing mechanism 1050 described above. The driving mechanism 1010 comprises a power supply and control unit (not shown) configured to provide electrical current to the piezoelectric elements 1020.

The piezoelectric elements 1020 may be in the form of a piezoelectric layer, or piezoelectric patch. The piezoelectric elements 1020 may be comprised in one or more amplified piezoelectric actuators (not shown). An amplified piezoelectric actuator is a device having an amplifier, preferably an elliptic elastic amplifier, which bends in response to changes in the shape of the piezoelectric actuator. Advantageously, an amplified piezoelectric actuator may increase the magnitude of the force that can be generated compared with conventional piezoelectric patches.

As illustrated in FIGS. 14 to 16, the one or more piezoelectric elements 1020 are provided on the resonator 1. Specifically, the one or more piezoelectric elements 1020 are attached to the one or more connection elements 30. Such a construction is simple to manufacture. Additionally, or alternatively, one or more piezoelectric elements 1020 may be embedded in the one or more connection elements 30. Advantageously, in this way, the construction is robust, by virtue of the piezoelectric elements 1020 being protected by the connection elements 30.

In a highly advantageous example, the piezoelectric element 1020 and the connection element 30 may be integrally formed by additive layer manufacturing (ALM). That is, the piezoelectric element 1020 may be embedded in the connection element 30 by ALM. Advantageously, the shape and size of the piezoelectric elements 1020 can thereby be accurately defined.

Each resilient portion 32, 32*a* may be provided with a piezoelectric element 1020. In this way, the stiffness of each resilient portion 32, 32*a* may be controlled independently. The one or more piezoelectric elements 1020 may be provided on top of the respective resilient portion 32, 32*a*. In this way, construction is simplified.

Figure 17:
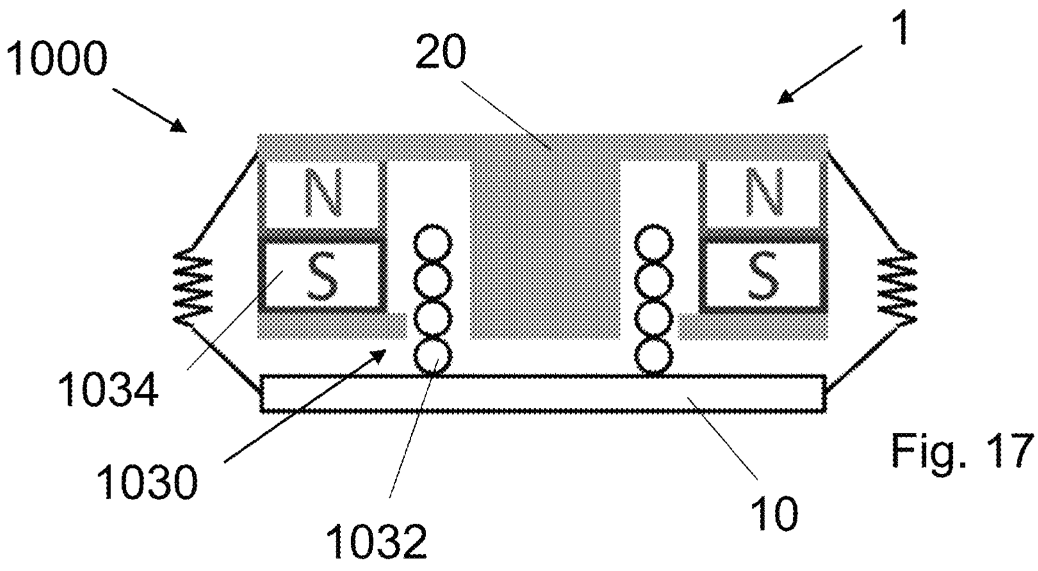
FIG. 17 shows a vibration control system.
Figure 18:
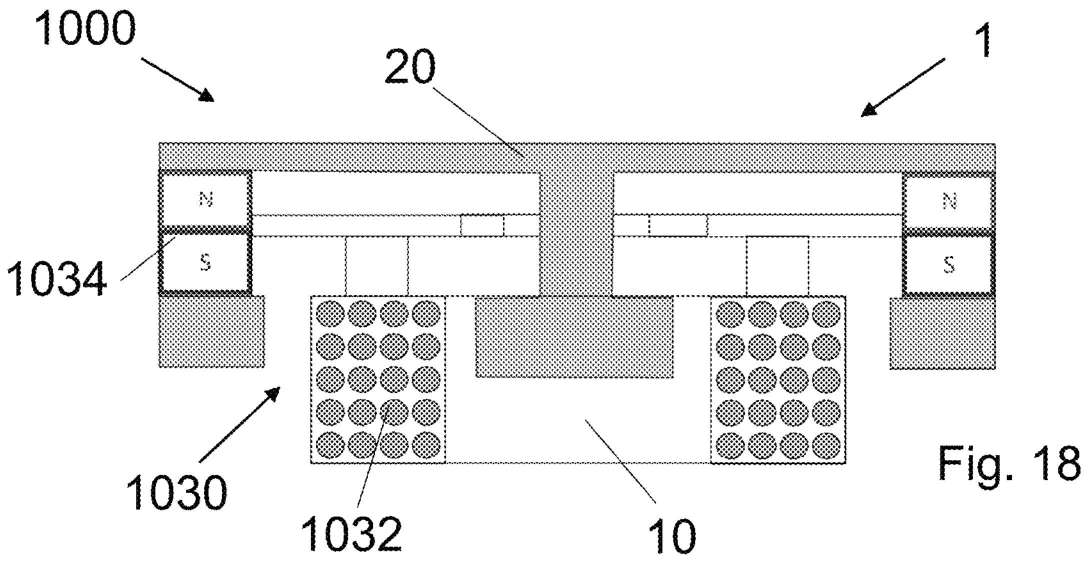
FIG. 18 shows a vibration control system.
Figure 19:
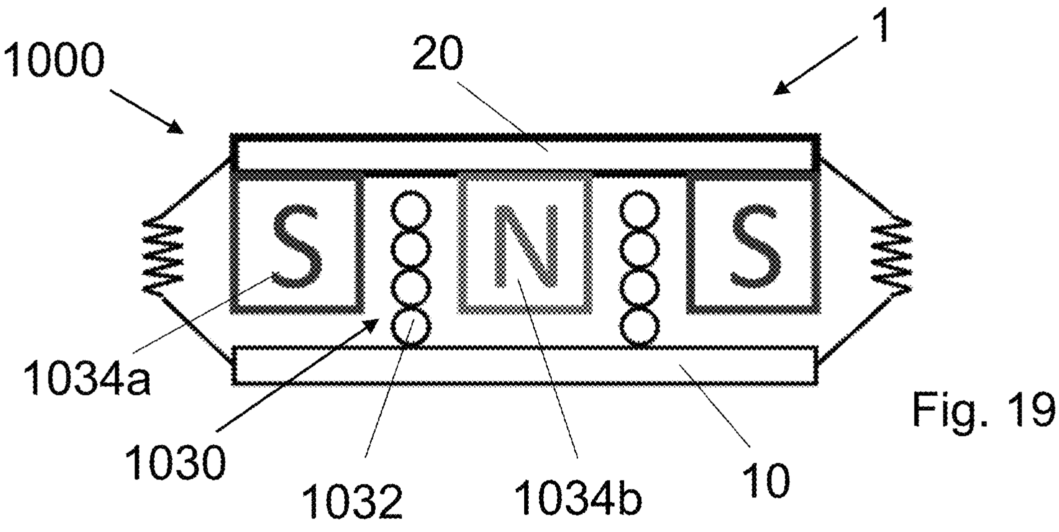
FIG. 19 shows a vibration control system.

Referring to FIGS. 17 to 19, a vibration control system 1000 comprising a driving mechanism 1010 according to a second exemplary embodiment is shown. The driving mechanism 1010 of the second embodiment comprises an electromagnetic (EM) actuator 1030. Advantageously, an EM actuator 1030 enables greater control over the driving of the resonator 1. Furthermore, the control element 20 may be directly driven, thereby increasing the amplitude of the force which may be generated, and thus the amplitude of vibrations that the vibration control system 1000 is capable of controlling/absorbing.

In an example, the EM actuator 1030 comprises a solenoid 1032 and one or more permanent magnets 1034. It will be appreciated that alternative constructions of EM actuator may be suitable to be employed in the driving mechanism 1010. In particular, it will be appreciated that alternative arrangements of one or more permanent magnets 1034 (for example, alternatives to the examples of FIGS. 17 to 19 described below) may be suitable to be employed in the driving mechanism 1010. That is, the EM actuator 1030 may comprise an arrangement of one or more permanent magnets 1034. In some instances, an arrangement of a plurality of permanent magnets 1034 may be provided, where the permanent magnets have a repulsive or attractive effect. Furthermore, it will be appreciated that, in an example, the one or more permanent magnets 1034 are provided at the control element 20 and the solenoid 1032 is provided at the base 10, or, in another example, the one or more permanent magnets 1034 are provided at the base 10 and the solenoid 1032 is provided at the control element 20.

FIG. 17 shows a side cross-sectional view of a first example of the vibration control system 1000 according to the second embodiment. The EM actuator 1030 comprises a solenoid 1032 and one or more permanent magnets 1034. The solenoid 1032 is provided at the base 10 of the resonator 1, and is mounted on top of the base 10 of the resonator 1. The EM actuator 1030 comprises an annular (e.g., ring shaped) permanent magnet 1034. The annular magnet 1034 is provided at the control element 20, by attachment thereto. The annular magnet 1034 corresponds in size with that of the control element 20. In other examples, a plurality of permanent magnets may be employed in place of the single annular magnet 1034. The solenoid 1032 may be provided on, or in, the base 10, and the one or more permanent magnets 1034 may be provided on, or in, the control element 20.

The solenoid 1032 and magnet 1034 are moveable relative to one another, by virtue of the solenoid 1032 being provided at the base 10 and the magnet 1034 being provided at the control element 20. The driving mechanism 1010 comprises a power supply and control unit (not shown) configured to provide electrical current to the solenoid 1032, thereby to generate a magnetic field.

FIG. 18 shows a side cross-sectional view of a second example of the vibration control system 1000 according to the second embodiment. In the second example, the solenoid 1032 is provided at the base 10 of the resonator 1 by being embedded therein. The solenoid 1032 and base 10 may be integrally formed, for example by ALM. In this way, a robust construction is provided wherein the solenoid 1032 is protected within the base.

The constructions of FIGS. 17 and 18 may be modified by instead providing the solenoid 1032 at the control element 20 and the one or more permanent magnets at the base 10. However, such a construction may be more complex, as an electrical connection will need to be formed with the solenoid 1032 which will move relative to the base 10 due to being provided at the control element 20.

FIG. 19 shows a side cross-sectional view of a third example of the vibration control system 1000 according to the second embodiment. In the third example, the EM actuator 1030 comprises a solenoid 1032 and one or more permanent magnets 1034*a*, 1034*b*. The solenoid 1032 is provided at the base 10 of the resonator 1, and is mounted on top of the base 10 of the resonator 1. The EM actuator 1030 comprises a first permanent magnet 1034*a*, which provides a south pole. The first permanent magnet 1034*a* may have an annular (e.g., ring-like) shape. The first permanent magnet 1034*a* is provided at the control element 20, optionally by attachment thereto. The EM actuator 1030 further comprises a second permanent magnet 1034*b*. The second permanent magnet 1034*b* has a cylindrical form. The second permanent magnet 1034*b* is centrally located. The second permanent magnet 1034*b* is provided at the control element 20, optionally by attachment thereto.

As mentioned above, it will be appreciated that alternative constructions and arrangements of solenoids and permanent magnets will be suitable to be employed as an EM actuator 1030.

Figure 20:
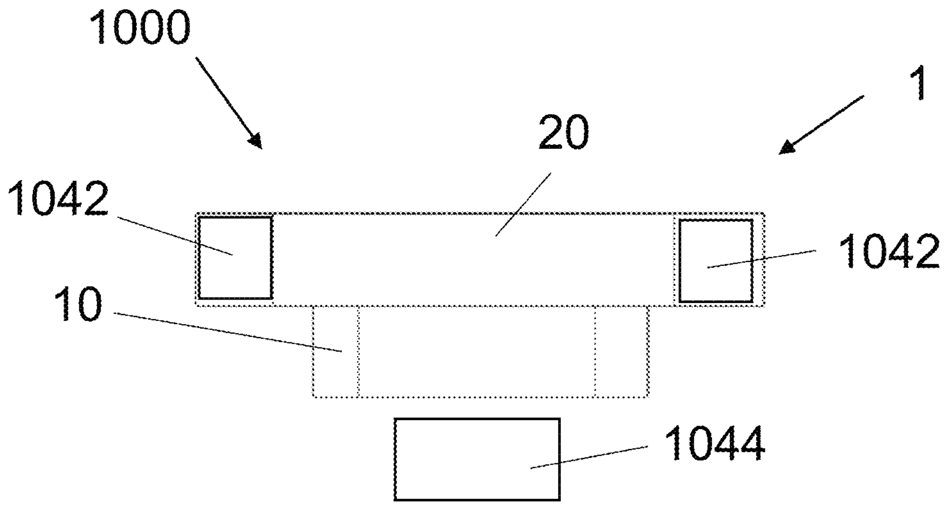
FIG. 20 shows a vibration control system.
Figure 21:
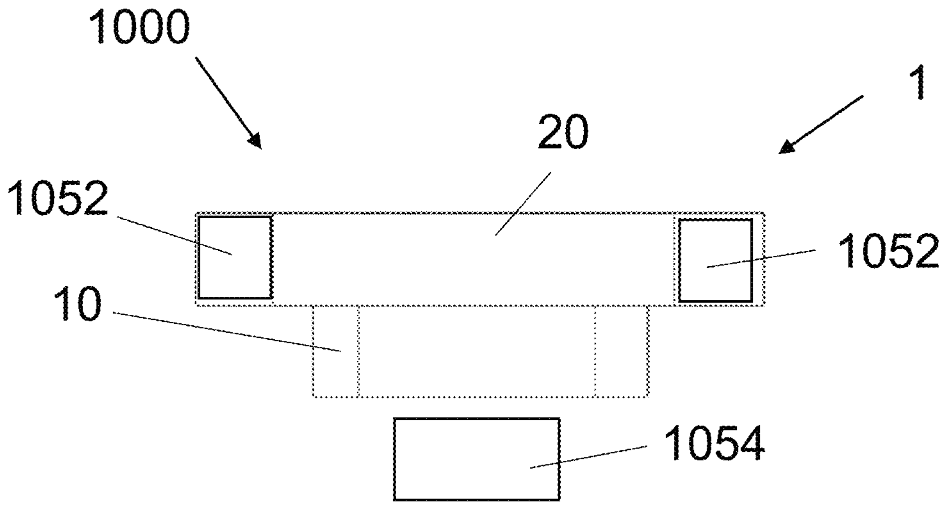
FIG. 21 shows a vibration control system.

Referring to FIGS. 20 and 21, a vibration control system 1000 comprising a driving mechanism 1010 according to a third and fourth exemplary embodiment is shown.

Referring to FIG. 20, the driving mechanism 1010 of the third embodiment comprises a magnetorheological elastomer 1042 and a magnetic field generating unit 1044. The resonator 1 comprises the magnetorheological elastomer 1042—that is, the resonator 1 comprises at least a part of the driving mechanism 1010. In the example shown, the control element 20 comprises the magnetorheological elastomer 1042. In another example, the control element 20 is formed entirely from magnetorheological elastomer 1042.

The magnetic field generating unit 1044 is operable to generate a magnetic field, for application to (e.g., interacting with, or influencing) the magnetorheological elastomer 1042. In this way, application of a magnetic field to the magnetorheological elastomer 1042 can influence a change in a property of the magnetorheological elastomer 1042, for example its stiffness. The resonance frequency of the resonator 1 can thus be controlled, and/or the resonator 1 can be driven by application of the magnetic field. Furthermore, advantageously, such function can be achieved without direct contact (e.g., wired connection) of the resonator 1 with the magnetic field generating unit 1044-a more robust construction is thus provided.

Referring to FIG. 21, the driving mechanism 1010 of the fourth embodiment comprises an electrorheological elastomer 1052 and an electric field generating unit 1054. The resonator 1 comprises the electrorheological elastomer 1052—that is, the resonator 1 comprises at least a part of the driving mechanism 1010. In the example shown, the control element 20 comprises the electrorheological elastomer 1052. In another example, the control element 20 is formed entirely from electrorheological elastomer 1052.

The electric field generating unit 1054 is operable to generate an electric field, for application to (e.g., interacting with, or influencing) the electrorheological elastomer 1052. In this way, application of an electric field to the electrorheological elastomer 1052 can influence a change in a property of the electrorheological elastomer 1052, for example its stiffness. The resonance frequency of the resonator 1 can thus be controlled, and/or the resonator 1 can be driven by application of the electric field. Furthermore, advantageously, such function can be achieved without direct contact (e.g., wired connection) of the resonator 1 with the electric field generating unit 1054—a more robust construction is thus provided.

In the third and fourth embodiments described above, ALM may be used to incorporate the magnetorheological elastomers and/or electrorheological elastomers in the resonator 1.

Figure 22:
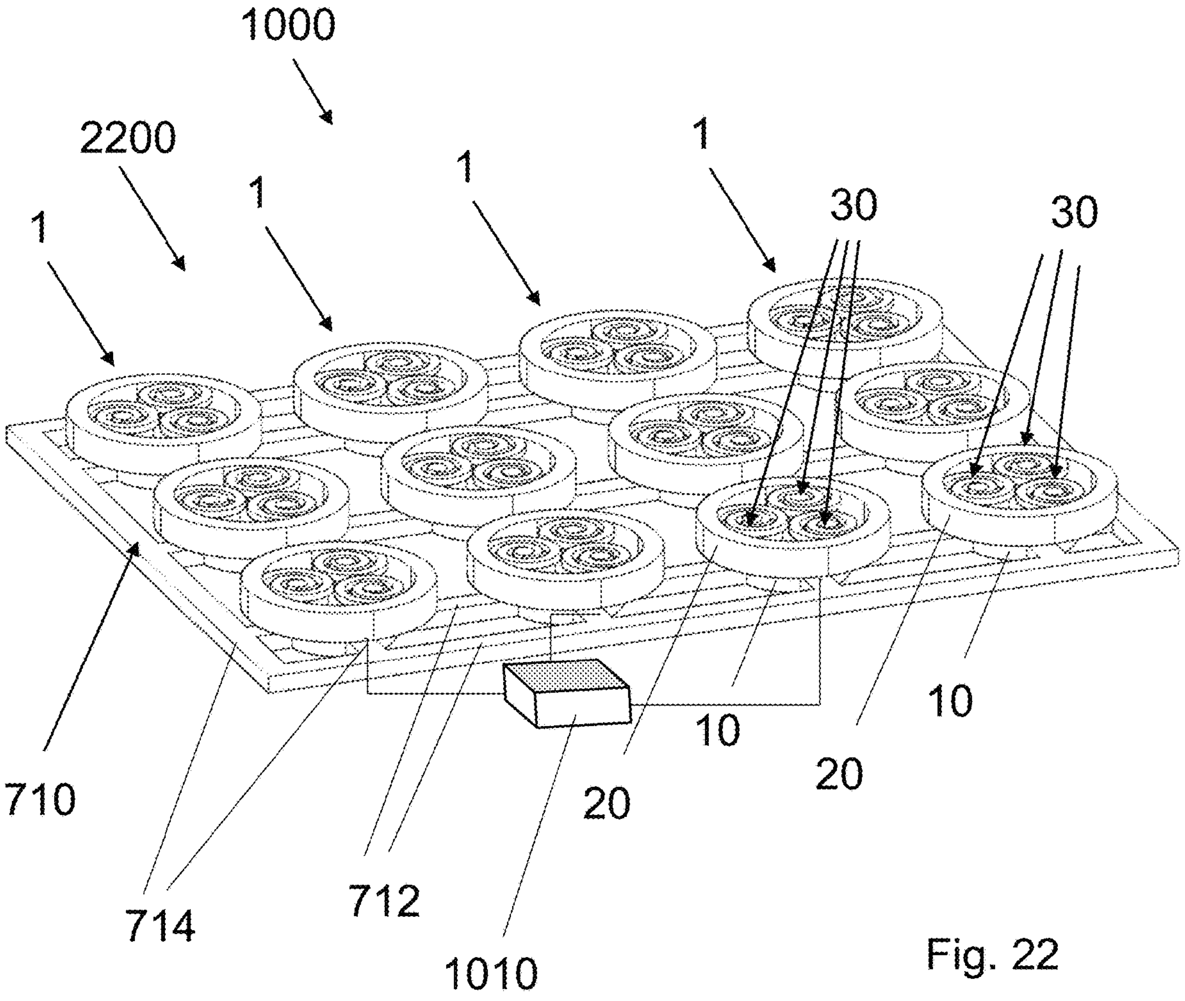
FIG. 22 shows a vibration control system comprising a resonator array.

Referring to FIG. 22, the vibration control system 1000 is shown to comprise a resonator array 2200. The resonator array 2200 has substantially the same construction as resonator array 700 as described in relation to FIG. 7 above, and description of the resonator array 2200 will not be repeated here for brevity. In FIG. 22, corresponding features are given corresponding reference numerals to those of FIG. 7. However, it will be appreciated that the resonators 1 may have resilient portions of alternative forms to spiral portions 32, such as straight portions 32*a* or other alternative forms.

Advantageously, by providing a resonator array 2200 in combination with a driving mechanism 1010, the magnitude of vibration absorption can be increased. Furthermore, the resonance frequency of the resonators 1 can be varied (i.e., selectively controlled) across the resonator array 2200, by appropriate control and operation of the driving mechanism 1010. That is, a plurality of modes of vibration of an external body may be controlled, despite the possibility of all resonators 1 having substantially the same construction. Advantageously, in this way, manufacture is simplified.

As above, the vibration control system 1000 comprising a resonator array 220 also comprises a driving mechanism, shown schematically at 1010. The driving mechanism 1010 may be as described herein in relation to FIGS. 12 to 21. The vibration control system 1000 may also comprise a sensing mechanism, such as sensing mechanism 1050 described above.

The driving mechanism 1010 may be in accordance with any of the first, second, third or fourth exemplary embodiments described above.

Importantly, with regard to the first embodiment of the driving mechanism 1010, one or more of the resonators 1 of the resonator array 2200 may be provided with piezoelectric elements 1020. In a highly advantageous example, all of the resonators 1 of the resonator array 2200 are provided with piezoelectric elements 1020. Uniform driving is thus facilitated across the resonator array 2200.

Importantly, with regard to the second embodiment of the driving mechanism 1010, one or more of the resonators 1 of the resonator array 200 may be provided with a part of the EM actuator 1030. That is, in an example, one or more of the resonators 1 may comprise permanent magnets 1034. A single solenoid 1032 may be provided, to generate a magnetic field for interacting with the permanent magnets 1034 of the one or more resonators 1. Alternatively, a plurality of solenoids 1032, optionally one solenoid 1032 for each resonator 1, may be provided, to generate a magnetic field for interacting with the permanent magnets 1034 of the one or more resonators 1 (e.g., a corresponding resonator 1). In this way, more precise vibration absorption and control is facilitated.

Importantly, with regard to the third and fourth embodiments of the driving mechanism 1010, each resonator 1 may comprise a magnetorheological elastomer 1042 and/or an electrorheological elastomer 1052, and a plurality of magnetic field generating units 1044 and/or electric field generating units 1054 may be provided. Alternatively, in a highly advantageous example, each resonator 1 may comprise a magnetorheological elastomer 1042 and/or an electrorheological elastomer 1052, and a single magnetic field generating unit 1044 and/or single electric field generating unit 10 may be provided for applying a magnetic field and/or electric field to all resonators 1.

It will be appreciated that the different embodiments of driving mechanisms 1010 may be combined in the resonator array 2200. That is, a single resonator array 2200 may comprise one or more driving mechanisms 1010 of the first embodiment, one or more driving mechanisms 1010 of the second embodiment, one or more driving mechanisms 1010 of the third embodiment, and/or one or more driving mechanisms 1010 of the fourth embodiment.

Figure 23:
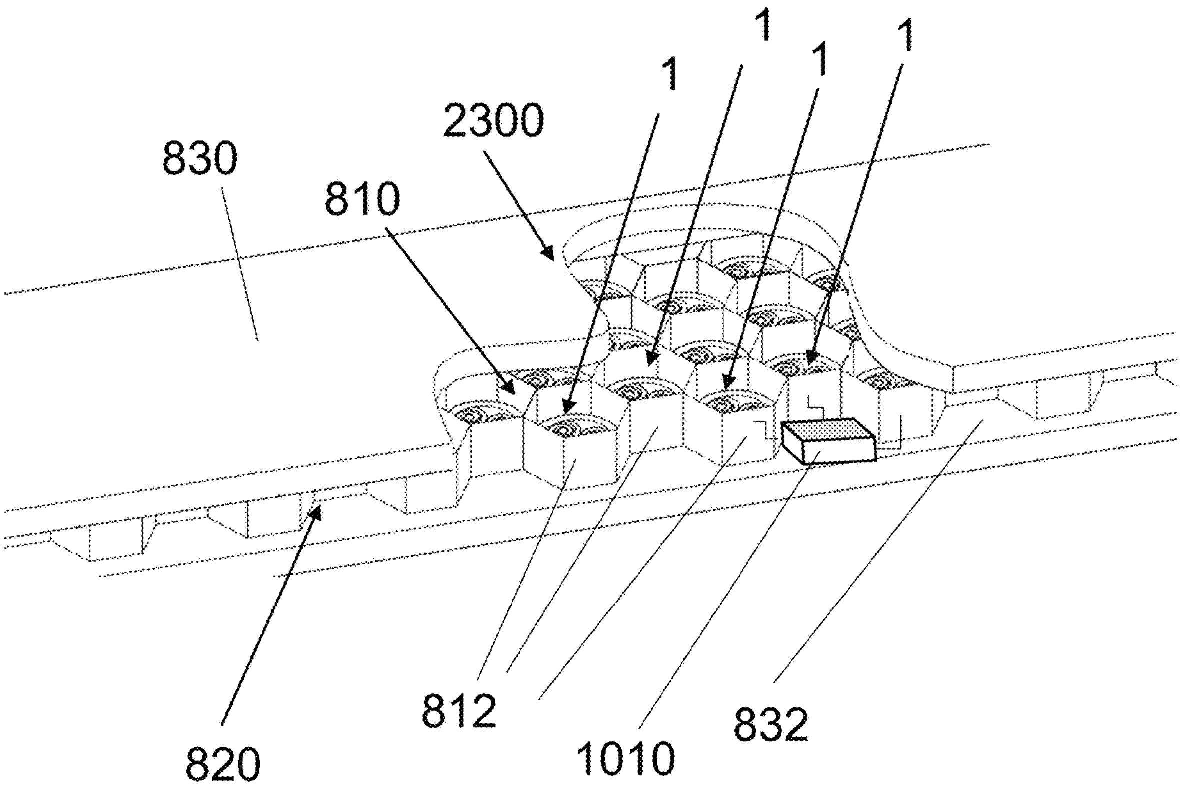
FIG. 23 shows a vibration control system comprising a pocketed resonator array.

Referring to FIG. 23, the vibration control system 1000 is shown to comprise a resonator array 2300. The resonator array 2300 has substantially the same construction as resonator array 800 described in relation to FIG. 8 above, and description of the resonator array 2300 will not be repeated here for brevity. In FIG. 23, corresponding features are given corresponding reference numerals to those of FIG. 8. However, it will be appreciated that the resonators 1 may have resilient portions of alternative forms to spiral portions 32, such as straight portions 32*a* or other alternative forms.

Advantageously, by providing a resonator array 2300 having a cell structure 810 in combination with a driving mechanism 1010, the vibration of the resonators 1 can be guided so as to provide a more predictable vibrational response, which is advantageous in that the driving mechanism 1010 need not provide driving in such a predictable manner. That is, the cell structure 810 can prevent vibration/absorption in particular axes. Furthermore, the vibration control system 1000 is protected by the cell structure.

Figure 24:
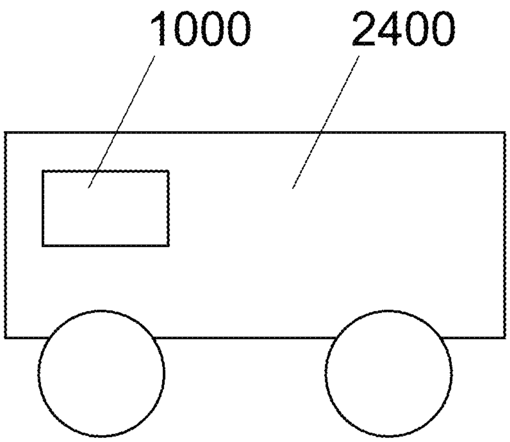
FIG. 24 shows a vehicle.

Referring to FIG. 24, a vehicle 2400 is shown. The vehicle 2400 comprises a source of vibration and a vibration control system 1000, as described above. The vibration control system 1000 may be operable to control the vibration of the source of vibration.

Figure 25:
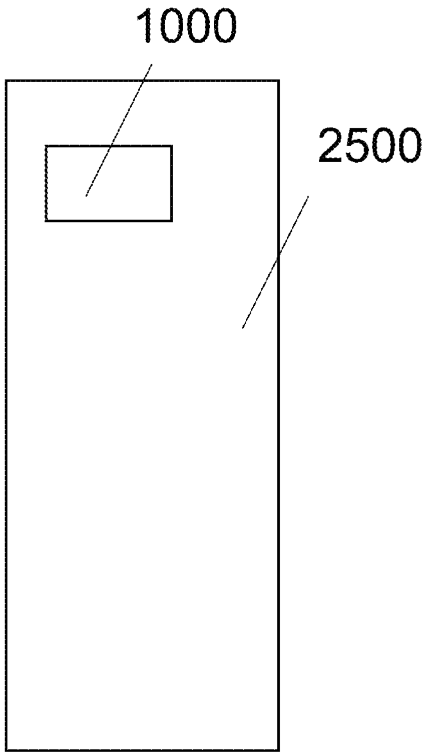
FIG. 25 shows a structure.

Referring to FIG. 25, a structure 2500 is shown. The structure 2500 comprises a source of vibration and a vibration control system 1000, as described above. The vibration control system 1000 may be operable to control the vibration of the source of vibration.

Figure 26:
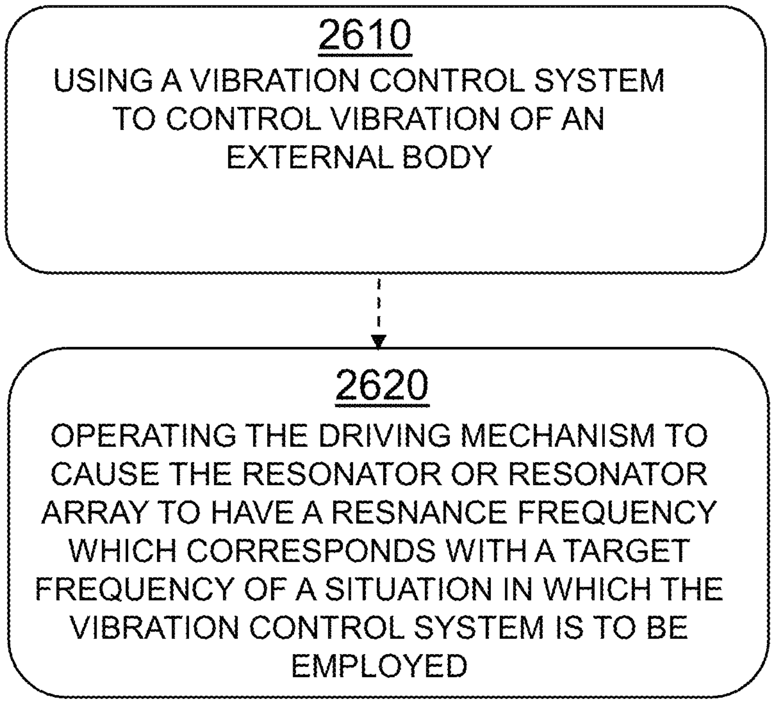
FIG. 26 shows general methodology principles.

Referring to FIG. 26, a method of controlling vibration is illustrated. Step 2610 comprises using a vibration control system 1000 to control vibration of an external body. A further, optional step 2620 comprises operating the driving mechanism to cause the resonator or resonator array to have a resonance frequency which corresponds with a target frequency of a situation in which the vibration control system is to be employed.

Figure 27:
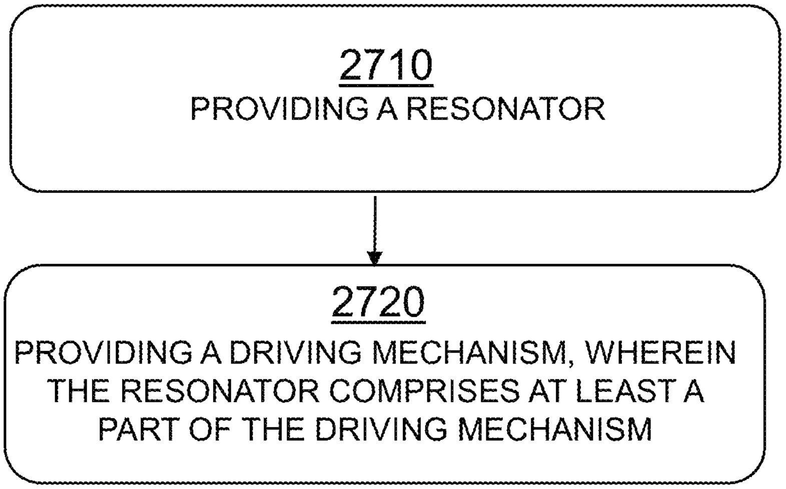
FIG. 27 shows general methodology principles.

Referring to FIG. 27, a method of manufacturing a vibration control system is illustrated. Step 2710 providing: a resonator comprising: a base attachable to an external body; a control element; and one or more connection elements each having a resilient spiral portion, wherein the control element is resiliently connected to the base by the one or more connection elements such that relative movement between the control element and the base is facilitated by the one or more connection elements. Step 2720 comprises providing a driving mechanism, wherein the resonator comprises at least a part of the driving mechanism.

The invention claimed is:

1. A vibration control system comprising:

a resonator including a base attachable to an external body, a control element having an annular form, a plurality of connection elements each having a resilient spiral portion and a free end, the free end of the resilient spiral portion connected to the control element, and a plurality of supports each having a first end connected to a respective one of the connection elements and a second end connected to the base, the second end being opposite the first end, wherein the control element is resiliently connected to the base by the connection elements such that relative movement between the control element and the base is facilitated by the connection elements; and a driving mechanism, wherein the resonator comprises at least a part of the driving mechanism.

2. The vibration control system according to claim 1, wherein the driving mechanism is operable to tune the resonator.

3. The vibration control system according to claim 1, wherein the driving mechanism is operable to provide an actuating force to the resonator.

4. The vibration control system according to claim 1, wherein the driving mechanism comprises one or more piezoelectric elements.

5. The vibration control system according to claim 4, wherein the one or more piezoelectric elements are attached to and/or embedded in the one or more connection elements.

6. The vibration control system according to claim 1, wherein the driving mechanism comprises an electromagnetic actuator.

7. The vibration control system according to claim 6, wherein the electromagnetic actuator comprises a solenoid and one or more permanent magnets.

8. The vibration control system according to claim 1, wherein the resonator comprises a magnetorheological elastomer and/or an electrorheological elastomer, and the driving mechanism comprises a magnetic field generating unit and/or an electric field generating unit.

9. The vibration control system according to claim 1, further comprising a sensing mechanism.

10. The vibration control system according to claim 1, wherein the connection elements each connect to the control element at a point of connection, wherein the points of connection are equidistantly spaced.

11. The vibration control system according to claim 1, wherein:

the resonator is one of a plurality of resonators included in a resonator array; and the bases of the resonators are connected by a framework.

12. A vehicle or structure comprising: a source of vibration; and a vibration control system according to claim 1.

13. A method of controlling vibration comprising:

using the vibration control system according to claim 1 to control vibration of the external body.

14. The vibration control system according to claim 7, wherein:

the solenoid is provided at the base, and the one or more permanent magnets are provided at the control element; or the solenoid is provided at the control element, and the one or more permanent magnets are provided at the base.

15. The vibration control system according to claim 1, wherein the resonator comprises an odd number of connection elements.

16. The vibration control system according to claim 15, wherein the resonator comprises three connection elements.

17. The method of claim 13, comprising:

operating the driving mechanism to cause the resonator to have a resonance frequency which corresponds with a target frequency of a situation in which the vibration control system is to be employed.

18. A method of manufacturing a vibration control system, the method comprising:

providing a resonator, the resonator including a base attachable to an external body, a control element having an annular form, a plurality of connection elements each having a resilient spiral portion and a free end, the free end of the resilient spiral portion connected to the control element, and a plurality of supports each having a first end connected to a respective one of the connection elements and a second end connected to the base, the second end being opposite the first end, wherein the control element is resiliently connected to the base by the connection elements such that relative movement between the control element and the base is facilitated by the one or more connection elements; and providing a driving mechanism, wherein the resonator comprises at least a part of the driving mechanism.

* * * * *